US012035812B2

(12) United States Patent
Huang et al.

(10) Patent No.: US 12,035,812 B2
(45) Date of Patent: Jul. 16, 2024

(54) AUTOMATED METHOD AND SYSTEM FOR PRODUCING AN INFLATABLE PRODUCT

(71) Applicant: Intex Marketing Ltd., Tortola (VG)

(72) Inventors: Zhi Xiong Huang, Fujian (CN); Hong Wen Li, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 823 days.

(21) Appl. No.: 16/772,400

(22) PCT Filed: Dec. 13, 2018

(86) PCT No.: PCT/IB2018/060046
§ 371 (c)(1),
(2) Date: Jun. 12, 2020

(87) PCT Pub. No.: WO2019/116312
PCT Pub. Date: Jun. 20, 2019

(65) Prior Publication Data
US 2021/0068554 A1 Mar. 11, 2021

(30) Foreign Application Priority Data

Dec. 14, 2017 (CN) .......................... 201711339752.0

(51) Int. Cl.
*A47C 27/08* (2006.01)
*B29C 65/78* (2006.01)
(Continued)

(52) U.S. Cl.
CPC ........ *A47C 27/087* (2013.01); *B29C 65/7802* (2013.01); *B29C 66/0326* (2013.01);
(Continued)

(58) Field of Classification Search
CPC ............. A47C 27/087; B29L 2031/751; B29L 2022/02; B29D 22/02; B29C 66/8432;
(Continued)

(56) References Cited

U.S. PATENT DOCUMENTS

| 5,659,908 A | 8/1997 | Nishino |
| 5,710,414 A | 1/1998 | Matsen |

(Continued)

FOREIGN PATENT DOCUMENTS

| CN | 101439583 A | 5/2009 |
| CN | 103600502 A | 2/2014 |

(Continued)

OTHER PUBLICATIONS

Merriam-Webster.com dictionary definition of "trim" date unknown.*

(Continued)

*Primary Examiner* — John L Goff, II
(74) *Attorney, Agent, or Firm* — Faegre Drinker Biddle & Reath LLP

(57) ABSTRACT

An automated system and method are disclosed for producing an inflatable product having a first sheet, a second sheet, and a plurality of tensioning structures between the first and second sheets. The system includes an upstream tensioning structure production subsystem that produces the tensioning structures and a downstream preassembly production subsystem that couples the tensioning structures to the first and second sheets. The subsystems may operate simultaneously to produce the inflatable product in an automated, efficient, and repeatable manner.

11 Claims, 20 Drawing Sheets

(51) Int. Cl.
   *B29D 22/02*   (2006.01)
   *B29C 65/00*   (2006.01)
   *B29L 22/02*   (2006.01)
   *B29L 31/00*   (2006.01)

(52) U.S. Cl.
   CPC ........... *B29D 22/02* (2013.01); *B29L 2022/02* (2013.01); *B29L 2031/751* (2013.01)

(58) Field of Classification Search
   CPC ........... B29C 66/81463; B29C 66/438; B29C 66/433; B29C 66/0326; B29C 65/7888; B29C 65/7858; B29C 65/7802; Y10T 156/1092–1097
   See application file for complete search history.

(56) References Cited

U.S. PATENT DOCUMENTS

| | | |
|---|---|---|
| 2013/0228268 A1 | 9/2013 | Lin |
| 2015/0147503 A1* | 5/2015 | Lin ..................... B29C 66/0044 156/163 |
| 2015/0157133 A1 | 6/2015 | Lau |
| 2017/0238718 A1 | 8/2017 | Xia et al. |

FOREIGN PATENT DOCUMENTS

| | | | |
|---|---|---|---|
| CN | 104441637 A | 3/2015 | |
| DE | 1479712 A1 | 7/1969 | |
| FR | 2456608 A1 | 12/1980 | |
| JP | 0767749 A * | 3/1995 | |
| JP | H07308242 | 11/1995 | |
| JP | 08-103957 A | 4/1996 | |
| JP | 2002254522 | 9/2002 | |
| SU | 268313 A1 | 4/1970 | |
| WO | 2002044076 | 6/2002 | |
| WO | 2013/130117 | 9/2013 | |
| WO | WO-2015077788 A1 * | 5/2015 | ........... A47C 27/081 |
| WO | 2017180657 | 10/2017 | |

OTHER PUBLICATIONS

European Search Report and Search Opinion Received for EP Application No. 18888739.2, dated Aug. 17, 2021, 8 pages.
International Search Report and Written Opinion as issued by the International Patent Application, dated Apr. 24, 2019, for International Patent Application No. PCT/IB2018/060046; 9 pages.
Extended European Search Report issued by the European Patent Office, dated Dec. 7, 2023, for European Patent Application No. 23195106.2; 8 pages.

* cited by examiner

AUTOMATED METHOD AND SYSTEM FOR PRODUCING AN INFLATABLE PRODUCT

CROSS REFERENCE TO RELATED APPLICATION

This application is a national stage application of PCT International Application No. PCT/IB2018/060046, filed Dec. 13, 2018, which claims priority to Chinese Application Serial No. 201711339752.0, filed Dec. 14, 2017, the disclosures of which are hereby expressly incorporated by reference herein in their entirety.

FIELD OF THE DISCLOSURE

The present disclosure relates to an automated system and method for producing an inflatable product. More particularly, the present disclosure relates to an automated system and method for producing an inflatable mattress.

BACKGROUND OF THE DISCLOSURE

Because they are light-weight, easy to assemble, and easy to transport, inflatable products are commonly used both outdoors and indoors. Such inflatable products include inflatable mattresses (i.e., airbeds), inflatable sofas and chairs, and inflatable pool floats, for example.

Inflatable products include internal tensioning structures to maintain a predetermined shape when inflated. The tensioning structures may be provided in various shapes, such I-shaped, C-shaped, or Z-shaped tensioning structures. The tensioning structures may be constructed of various materials, such as plastic, fabric, strands, mesh, combinations thereof, or other suitable materials. Exemplary tensioning structures are disclosed in International Publication Nos. WO 2013/130117, titled "INTERNAL TENSIONING STRUCTURES USABLE WITH INFLATABLE DEVICES", and WO 2015/010058, titled "INFLATABLE SPA," the disclosures of which are hereby expressly incorporated by reference herein in their entirety. In one example, the tensioning structure includes parallel, spaced-apart strands with ends sandwiched between plastic strips. In another example, the tensioning structure includes a mesh material sandwiched between plastic sheets.

Current inflatable products are produced manually. When producing an inflatable mattress, for example, an operator may have to individually weld a plurality of tensioning structures to upper and lower mattress sheets. These manual processes are time-consuming, expensive, and susceptible to human error.

SUMMARY

The present disclosure provides an automated system and method for producing an inflatable product having a first sheet, a second sheet, and a plurality of tensioning structures between the first and second sheets. The system includes an upstream tensioning structure production subsystem that produces the tensioning structures and a downstream pre-assembly production subsystem that couples the tensioning structures to the first and second sheets. The subsystems may operate simultaneously to produce the inflatable product in an automated, efficient, and repeatable manner.

According to an exemplary embodiment of the present disclosure, a method is disclosed for producing an inflatable product including a first sheet and a second sheet. The method includes: aligning a leading end of a first tensioning structure with a first welder and the first sheet; aligning a trailing end of the first tensioning structure with a second welder and the second sheet; and simultaneously welding the leading end of the first tensioning structure to the first sheet and the trailing end of the first tensioning structure to the second sheet by simultaneously operating the first and second welders.

In certain embodiments, the method further includes: conveying the first sheet to the first welder in a first direction; and conveying the second sheet to the second welder in a second direction opposite the first direction. The method may also include conveying the first and second sheets and the first tensioning structure between the first and second welders in a third direction perpendicular to the first and second directions.

In certain embodiments, the method further includes: producing a second tensioning structure; and cutting the first and second tensioning structures to separate the trailing end of the first tensioning structure from a leading end of the second tensioning structure; wherein the trailing end of the first tensioning structure is positioned adjacent to the leading end of the second tensioning structure during the welding step.

In certain embodiments, the method further includes cutting the first and second sheets after the welding step.

In certain embodiments, the method further includes: producing a second tensioning structure in series with the first tensioning structure; welding the second tensioning structure to the first and second sheets; producing a third tensioning structure in series with the second tensioning structure; welding the third tensioning structure to the first and second sheets; and cutting the first and second sheets between the second and third tensioning structures.

In certain embodiments, the first welder is arranged vertically, the second welder is arranged vertically, and the first tensioning structure is arranged generally horizontally between the first and second welders during the welding step.

In certain embodiments, the first tensioning structure moves horizontally before the welding step and moves vertically after the welding step.

In certain embodiments, the method further includes: welding a first pair of weld strips together at the leading end of the first tensioning structure with a plurality of strands captured therebetween; and welding a second pair of weld strips together at the trailing end of the first tensioning structure with the plurality of strands captured therebetween. The method may also include adjusting a length of the plurality of strands between the first and second pairs of weld strips after welding the first pair of weld strips and before welding the second pair of weld strips.

According to another exemplary embodiment of the present disclosure, a system is disclosed for producing an inflatable product including a first sheet and a second sheet. The system includes: a conveyor; a first mold coupled to the conveyor and configured to support a leading end of a first tensioning structure; a second mold coupled to the conveyor and configured to support a trailing end of the first tensioning structure and a leading end of a second tensioning structure; a third mold coupled to the conveyor and configured to support a trailing end of the second tensioning structure; a first welder configured to weld the first sheet to the leading end of the first tensioning structure when the first mold is aligned with the first welder and to the leading end of the second tensioning structure when the second mold is aligned with the first welder; and a second welder configured to weld the second sheet to the trailing end of the first tensioning structure when the second mold is aligned with the second welder and to the trailing end of the second tensioning structure when the third mold is aligned with the second welder.

In certain embodiments, the second welder is sized to contact the trailing end of the first tensioning structure without contacting the leading end of the second tensioning structure.

In certain embodiments, the system further includes a blade positioned upstream of the first and second welders, the blade configured to separate the trailing end of the first tensioning structure from the leading end of the second tensioning structure. Each of the first, second, and third molds may include: a generally flat upper surface configured to support the ends of the corresponding tensioning structures; a slit in the upper surface configured to accommodate the blade; and at least one tooth that extends upwardly from the upper surface to retain the ends of the corresponding tensioning structures on the upper surface. The at least one tooth may be moveable relative to the upper surface upstream of the first and second welders to avoid contact with the first and second sheets. Each of the first and second tensioning structures may include a plurality of strands extending between the leading and trailing ends with at least one space between the plurality of strands, and the at least one tooth may extend into the at least one space between the plurality of strands.

In certain embodiments, the system further includes a blade positioned downstream of the first and second welders, the blade configured to cut the first and second sheets after the first and second tensioning structures such that the first and second tensioning structures are part of the same inflatable product.

According to another exemplary embodiment of the present disclosure, a system is disclosed for producing an inflatable product including a first sheet and a second sheet. The system includes: a tensioning structure production subsystem configured to produce at least a first tensioning structure having a leading end and a trailing end and a second tensioning structure having a leading end and a trailing end, the tensioning structure production subsystem including a first blade configured to separate the trailing end of the first tensioning structure from the leading end of the second tensioning structure; and a preassembly production subsystem in communication with the tensioning structure production subsystem and configured to couple the leading ends of the first and second tensioning structures to the first sheet and the trailing ends of the first and second tensioning structures to the second sheet, the preassembly production subsystem including a second blade configured to cut the first and second sheets after the first and second tensioning structures.

In certain embodiments, the tensioning structure production subsystem operates simultaneously with the preassembly production subsystem.

In certain embodiments, the first tensioning structure is coupled to the first and second sheets while the second tensioning structure is aligned with the first blade.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

1. Preassembly of Inflatable Product

Figure 1:
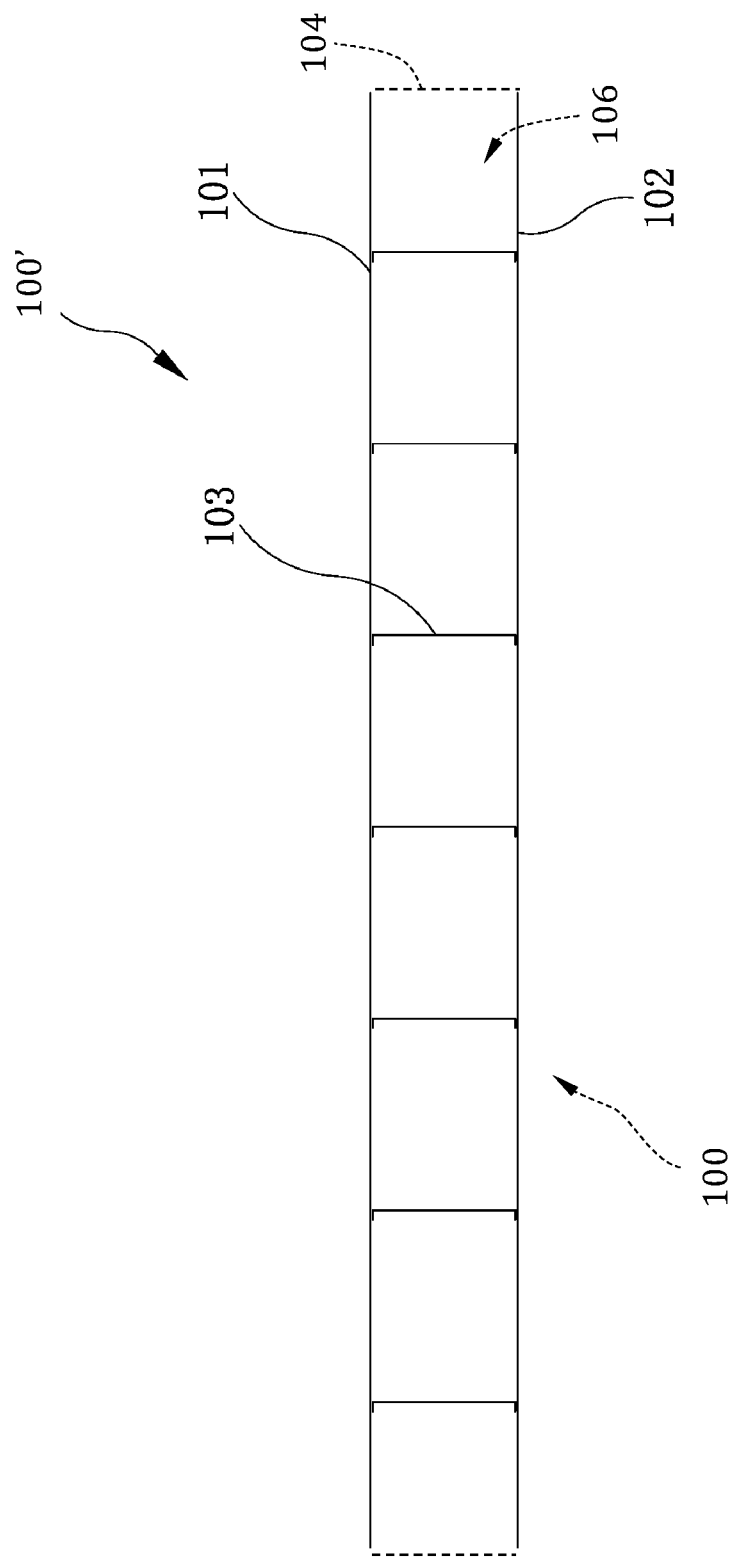
FIG. 1 is a schematic view of an inflatable product of the present disclosure, the inflatable product including a preassembly with an upper sheet, a lower sheet, and a plurality of tensioning structures.

FIG. 1 is a schematic view of an inflatable product 100, specifically an inflatable mattress, including an upper sheet 101 which serves as a sleeping surface, a lower sheet 102 which serves as a ground-contacting surface, a plurality of internal tensioning structures 103 coupled to the upper and lower sheets 101, 102, and an annular side wall 104 (shown in phantom) coupled to perimeter edges the upper and lower sheets 101, 102. The upper sheet 101, lower sheet 102, and side wall 104 cooperate to define an inflatable chamber 106. It is also within the scope of the present disclosure that upper and lower sheets 101, 102 may be directly coupled together without the intermediate side wall 104. A valve (not shown) and/or a built-in pump (not shown) may be provided in communication with the inflatable chamber 106 to facilitate inflation and deflation of the inflatable product 100. Although the inflatable product 100 is described herein as a mattress, it is also within the scope of the present disclosure for the inflatable product 100 to be an inflatable sofa, chair, or pool float, for example.

An automated system and method are provided to produce the inflatable product 100 or a portion thereof. In certain embodiments, the system and method produce a preassembly 100' of the inflatable product 100, where the preassembly 100' includes the upper and lower sheets 101, 102, and the tensioning structures 103. In this embodiment, the side wall 104, valve, built-in pump, and other elements may be added to the preassembly 100' later to produce the final inflatable product 100. For example, the side wall 104 may be welded to perimeter edges of the upper and lower sheets 101, 102 after producing the preassembly 100'. The preassembly 100' may be constructed partially or entirely of weldable plastic (e.g., PVC). For example, at least the interfacing portions of the upper and lower sheets 101, 102, and the tensioning structures 103 of the preassembly 100' may be constructed of weldable plastic.

2. First Embodiment (FIGS. 2-14)

Figure 2:
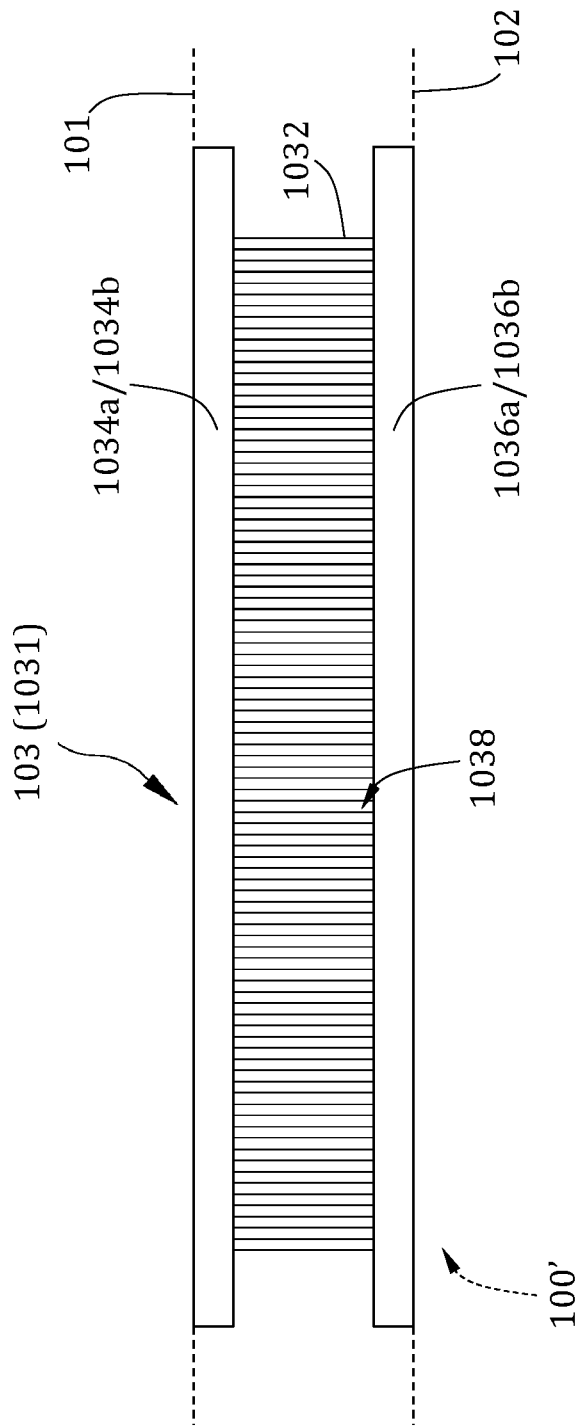
FIG. 2 is a schematic view of a first tensioning structure of the present disclosure.

FIG. 2 discloses a first exemplary tensioning structure 300, specifically tensioning structure 1031, for use in the inflatable product 100 of FIG. 1. The illustrative tensioning structure 1031 includes a plurality of parallel, spaced apart strands 1032, such as strings or wires, with spaces 1038 between adjacent strands 1032. Upper ends of the strands 1032 are coupled to at least one upper weld strip 1034, and lower ends of the strands 1032 are coupled to at least one lower weld strip 1036. According to an exemplary embodiment of the present disclosure, the strands 1032 are sandwiched between a pair of upper weld strips 1034a/1034b and a pair of lower weld strips 1036a/1036b disposed on opposing sides of the strands 1032. However, it is also within the scope of the present disclosure to use a single upper weld strip 1034 and a single lower weld strip 1036, each disposed on only one side of the strands 1032.

The tensioning structure 1031 of FIG. 2 may be incorporated into the inflatable product 100 of FIG. 1 by welding the at least one upper weld strip 1034 to the upper sheet 101 and the at least one lower weld strip 1036 to the lower sheet 102 with the strands 1032 extending vertically therebetween. When the inflatable chamber 106 of FIG. 1 is inflated, the strands 1032 are pulled taut and provide a high tensile strength between the opposed upper and lower weld strips 1034, 1036. At the same time, the upper and lower sheets 101, 102 and the upper and lower weld strips 1034, 1036 are constructed partially or entirely of weldable plastic (e.g., PVC) to facilitate a strong, long-lasting weld between the tensioning structure 1031 and the inflatable product 100. Additional information regarding tensioning structure 1031 is disclosed in the above-incorporated International Publication No. WO 2013/130117.

Figure 3:
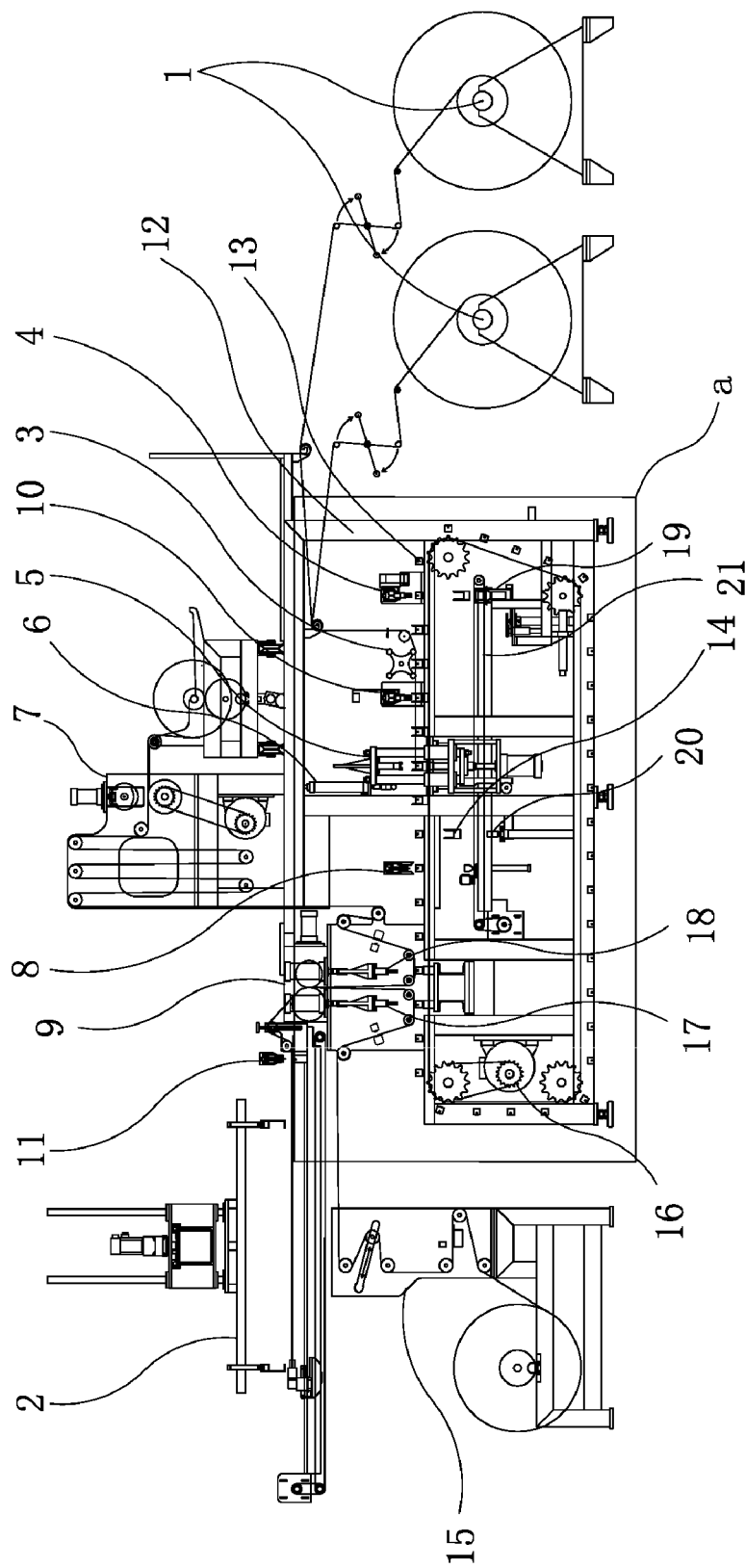
FIG. 3 is a schematic view of a first production system of the present disclosure.
Figure 4:
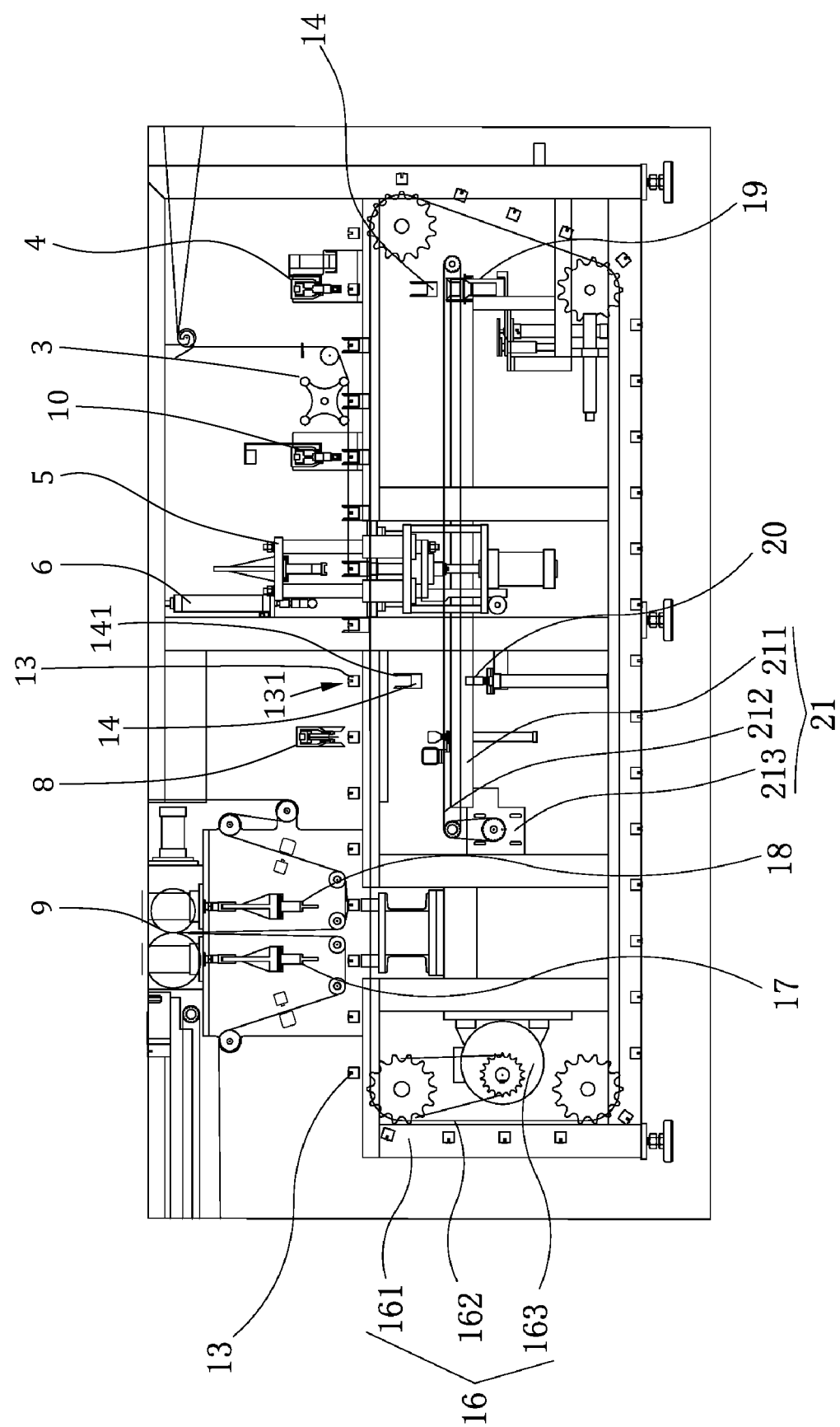
FIG. 4 is an enlarged view of section a of FIG. 3.

Referring next to FIGS. 3 and 4, an automated system is provided to produce at least the preassembly 100' of FIG. 2, specifically the upper and lower sheets 101, 102, and the tensioning structures 1031. An upstream end of the system (e.g, the right side of FIGS. 3 and 4) produces the tensioning structures 1031 of FIG. 2 and may be referred to herein as a tensioning structure production subsystem. A downstream end of the system (e.g., the left side of FIGS. 3 and 4) produces the preassembly 100' of FIG. 2 by coupling the tensioning structures 1031 to the upper and lower sheets 101, 102, and may be referred to herein as a preassembly production subsystem. The upstream, tensioning structure production subsystem includes one or more strand sources 1 (e.g., rollers), a bottom strip mechanism 4, a strand pressing mechanism 3 (e.g., roller), a top strip mechanism 10, a tensioning structure fusing mechanism 5, a tensioning structure length adjusting mechanism 6, a tensioning structure cutting mechanism 8, a plurality of bottom molds 13, a plurality of comb bottom molds 14, a bottom mold conveying mechanism 16, a comb bottom mold raising mechanism 19, a comb bottom mold lowering mechanism 20, and a comb bottom mold conveying mechanism 21. The downstream, preassembly production subsystem includes an upper sheet source 7 (e.g., roller), a lower sheet source 15 (e.g., roller), an upper sheet fusing mechanism 18 (e.g., welder), a lower sheet fusing mechanism 17 (e.g., welder), a preassembly outputting mechanism 9 (e.g., rollers), a preassembly cutting mechanism 11, and a preassembly receiving mechanism 2.

Referring still to FIGS. 3 and 4, the illustrative production system includes a frame 12. The strand source 1 is placed at the upstream portion of the frame 12, the upper sheet source 7 is mounted at the top, intermediate portion of the frame 12, and the lower sheet source 15 is mounted at the bottom, downstream portion of the frame 12. The mold conveying mechanism 16, the comb bottom mold conveying mechanism 21, the lower sheet fusing mechanism 17, and the upper sheet fusing mechanism 18 are mounted at a bottom, intermediate portion of the frame 12. The preassembly outputting mechanism 9 is mounted to the top of the frame 12 between the lower sheet fusing mechanism 17 and the upper sheet fusing mechanism 18. The preassembly cutting mechanism 11 is mounted on the top portion of the frame 12 in communication with the preassembly outputting mechanism 9. The preassembly receiving mechanism 2 is mounted on the top, downstream portion of the frame 12 in communication with the preassembly outputting mechanism 9 and the preassembly cutting mechanism 11.

Figure 5:
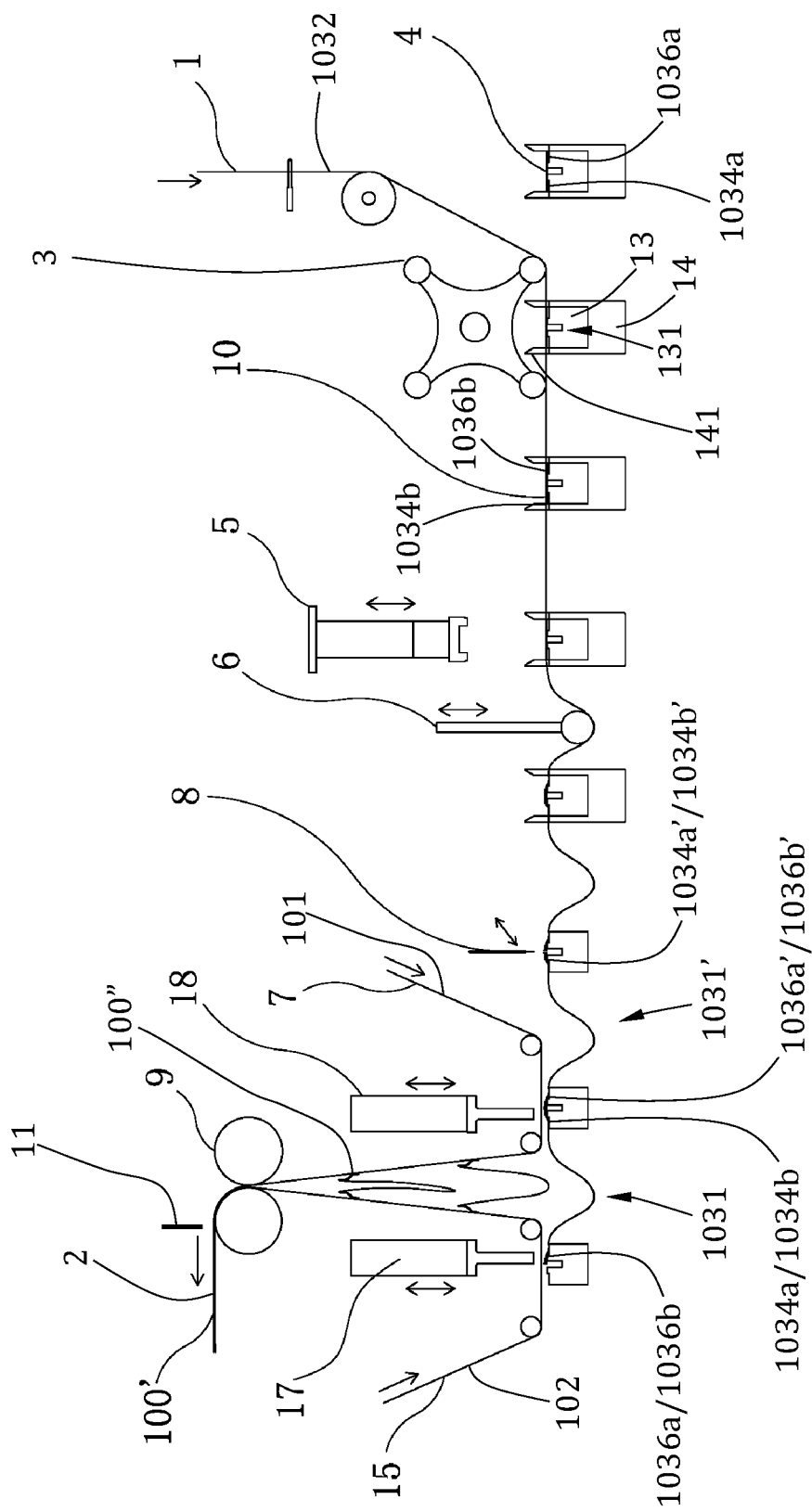
FIG. 5 is a schematic view of a first production method of the present disclosure.

Referring next to FIG. 5, an exemplary method is provided to produce the preassembly 100' of FIG. 2 using the above-described system of FIGS. 3 and 4.

In a first step (S1), the tensioning structure 1031 is produced by conveying the bottom molds 13 through the system. This step S1 begins by layering the desired materials of the tensioning structure 1031 upon the bottom molds 13. The bottom strip mechanism 4 is operated to dispense the bottom weld strip material 1034a/1036a. Next, the strand pressing mechanism 3 is operated to apply the strands 1032 on top of and across the bottom weld strip material 1034a/1036a. Then, the top strip mechanism 10 is operated to apply the top weld strip material 1034b/1036b on top of the strands 1032 and the bottom weld strip material 1034a/1036a. In the illustrated embodiment of FIG. 5, the bottom strip mechanism 4 applies the bottom weld strip material 1034a/1036a beneath the strands 1032, and the top strip mechanism 10 applies the top weld strip material 1034b/1036b on top of the strands 1032 such that the strands 1032 become captured between the overlapping bottom weld strip material 1034a/1036a and top weld strip material 1034b/1036b. However, it is also within the scope of the present disclosure to use the bottom strip mechanism 4 alone and secure the strands 1032 to the bottom weld strip material 1034a/1036a only. Alternatively, it is within the scope of the present disclosure to use the top strip mechanism 10 alone and secure the strands 1032 to the top weld strip material 1034b/1036b only.

The step S1 continues downstream by assembling the desired materials of the tensioning structure 1031 on the bottom molds 13. The tensioning structure fusing mechanism 5 is operated to weld the bottom weld strip material 1034a to the corresponding top weld strip material 1034b, thereby forming the upper weld strip pair 1034a/1034b, and the bottom weld strip material 1036a to the corresponding top weld strip material 1036b, thereby forming the lower weld strip pair 1036a/1036b, with the strands 1032 captured therebetween. As noted above, it is also within the scope of the present disclosure to secure the strands 1032 to the bottom weld strip material 1034a/1036a only or the top weld strip material 1034b/1036b only. Next, the tensioning structure length adjusting mechanism 6 is operated to adjust the length of the strands 1032 between the opposing upper weld strip pair 1034a/1034b and lower weld strip pair 1036a/1036b by pressing or pulling the strands 1032. In the illustrated embodiment of FIG. 5, the tensioning structure length adjusting mechanism 6 contacts the strands 1032 at a location where the leading ends of the strands 1032 are held in place by pre-welded weld strip pairs 1034a/1034b and 1036a/1036b (i.e., downstream of the tensioning structure fusing mechanism 5) and the trailing ends of the strands 1032 are free to move relative to un-welded weld strip materials 1034a/1036a and 1034b/1036b (i.e., upstream of or before activating the tensioning structure fusing mechanism 5). After operating the tensioning structure length adjusting mechanism 6, the tensioning structure fusing mechanism 5 operates again to capture the trailing ends of the length-adjusted strands 1032. Finally, the tensioning structure cutting mechanism 8 is operated to cut the strands 1032 and to cut the weld strip materials 1034a/1036a and 1034b/1036b generally in half, which separates a leading tensioning structure 1031 from a trailing tensioning structure 1031'. After the cutting step, the upper weld strip pair 1034a/1034b of the leading tensioning structure 1031 is positioned immediately adjacent to the lower weld strip pair 1036a'/1036b' of the trailing tensioning structure 1031' on the same bottom mold 13.

In a second step (S2), the upper sheet 101 is conveyed from the upper sheet source 7 to the upper sheet fusing mechanism 18, and the lower sheet 102 is conveyed from the lower sheet source 15 to the lower sheet fusing mechanism 17. In the illustrated embodiment of FIG. 5, the upper sheet source 7 is located on the right side of the upper sheet fusing mechanism 18 such that the upper sheet 101 travels leftward from the upper sheet source 7 to the upper sheet fusing mechanism 18. By contrast, the lower sheet source 15 is located on the opposite, left side of the lower sheet fusing mechanism 17 such that the lower sheet 102 travels rightward from the lower sheet source 15 to the lower sheet fusing mechanism 17.

In a third step (S3), the completed tensioning structure 1031 is moved into alignment with the lower sheet fusing mechanism 17 and the upper sheet fusing mechanism 18. Specifically, the lower weld strip pair 1036a/1036b of the tensioning structure 1031 is moved into alignment with the lower sheet fusing mechanism 17 beneath the lower sheet 102, and the upper weld strip pair 1034a/1034b of the tensioning structure 1031 is moved into alignment with the upper sheet fusing mechanism 18 beneath the upper sheet 101. In the illustrated embodiment of FIG. 5, the tensioning structure travels leftward from the tensioning structure cutting mechanism 8 to the sheet fusing mechanisms 17, 18. Also in the illustrated embodiment of FIG. 5, the lower sheet fusing mechanism 17 is arranged vertically, the upper sheet fusing mechanism 18 is arranged vertically and spaced apart from the lower sheet fusing mechanism 17, and the tensioning structure 1031 is arranged generally horizontally therebetween. In this arrangement, the strands 1032 may droop vertically downward between the lower sheet fusing mechanism 17 and the upper sheet fusing mechanism 18, thereby avoiding interference with the sheet fusing mechanisms 17, 18.

In a fourth step (S4), the lower sheet fusing mechanism 17 and the upper sheet fusing mechanism 18 are operated simultaneously to weld the lower sheet 102 and the upper sheet 101, respectively, to the tensioning structure 1031 to form a finished sheet 100". Specifically, the lower sheet fusing mechanism 17 welds the lower sheet 102 to the lower weld strip pair 1036a/1036b of the tensioning structure 1031, and the upper sheet fusing mechanism 18 welds the upper sheet 101 to the upper weld strip pair 1034a/1034b of the tensioning structure 1031. The size of the upper sheet fusing mechanism 18, in particular, may be controlled to contact the upper weld strip pair 1034a/1034b of the leading tensioning structure 1031 without contacting the lower weld strip pair 1036a'/1036b' of the immediately adjacent trailing tensioning structure 1031'. Therefore, the lower weld strip pair 1036a'/1036b' of the trailing tensioning structure 1031' remains free from the upper sheet 101 and is advanced to the lower sheet 102 during the next cycle.

In a fifth step (S5), the finished sheet 100" is conveyed to the preassembly receiving mechanism 2 using the preassembly outputting mechanism 9. In the illustrated embodiment of FIG. 5, the finished sheet 100" travels vertically upward between the upper and lower sheet fusing mechanisms 17, 18 on its way to the preassembly outputting mechanism 9. The tensioning structures 1031 may be folded with the strands 1032 continuing to droop vertically downward as the finished sheet 100" approaches the preassembly outputting mechanism 9. The above steps S1-S5 are repeated until the finished sheet 100" reaches a desired length (i.e., the length of the inflatable product 100 of FIG. 1).

In a sixth step (S6), the finished sheet 100" is cut using the preassembly cutting mechanism 11 disposed between the preassembly outputting mechanism 9 and the preassembly receiving mechanism 2 to form the preassembly 100'. The cutting may be performed between adjacent tensioning structures 1031 to avoid cutting the tensioning structure 1031 itself. The preassembly 100' may be stored on the preassembly receiving mechanism 2 or moved to another location. The preassembly 100' may then be subjected to final processing steps to form the inflatable product 100 of FIG. 1.

The above steps S1-S6 may be performed simultaneously, such that the trailing tensioning structure 1031' is being produced while the leading tensioning structure 1031 is being welded to the upper and lower sheets 101, 102. This method allows at least the preassembly 100' of the inflatable product (FIG. 1) to be produced in an automated, efficient, and repeatable manner.

Various equipment of the production system will now be described in further detail.

Referring back to FIG. 4, the bottom mold conveying mechanism 16 includes a support frame 161, a conveyor belt 162 wrapped around the support frame 161, and a driving motor 163 fixedly mounted on one side of the support frame 161. In operation, the driving motor 163 drives the conveyor belt 162 to move about the support frame 161. The plurality of bottom molds 13 are equally spaced and mounted on the conveyor belt 162 of the bottom mold conveying mechanism 16 and move along with the conveyor belt 162. In addition to supporting the conveyor belt 162, the support frame 161 may also support, from right to left in FIG. 4, the bottom strip mechanism 4, the strand pressing mechanism 3, the top strip mechanism 10, the tensioning structure fusing mechanism 5, the tensioning structure length adjusting mechanism 6, the tensioning structure cutting mechanism 8, the upper sheet fusing mechanism 18, and the lower sheet fusing mechanism 17. Each illustrative bottom mold 13 is an elongate conductive rail having a generally flat upper surface configured to interact with the bottom and top strip mechanisms 4, 10 and a lower surface configured to interact with the comb bottom mold 14. Each bottom mold 13 also includes a central recess or slit 131 in the flat upper surface configured to interact with the tensioning structure cutting mechanism 8.

Referring still to FIG. 4, the comb bottom mold conveying mechanism 21 includes a support frame 211, a conveyor belt 212 wrapped around the support frame 211, and a driving motor 213 fixedly mounted on one side of the support frame 211. In operation, the driving motor 213 drives the conveyor belt 212 to move about the support frame 211. The plurality of comb bottom molds 14 are spaced apart from each other and mounted on the conveyor belt 212 of the comb bottom mold conveying mechanism 21. Each illustrative comb bottom mold 14 is an elongate conductive element configured to interact with (e.g., muff-couple with) the bottom mold 13. Both the comb bottom mold raising mechanism 19 and the comb bottom mold lowering mechanism 20 are mounted beneath a working surface of the bottom mold conveying mechanism 16. The comb bottom mold raising mechanism 19 is aligned with the bottom strip mechanism 4 and has an electric telescopic rod that is configured to raise the comb bottom mold 14 into engagement with the bottom mold 13. The comb bottom mold 14 has one or more rows of combing teeth 141 that extend upward beyond the bottom mold 13 to retain the weld strip materials 1034a/1036a and 1034b/1036b on the bottom mold 13. The combing teeth 141 are also configured for receipt in the spaces 1038 between the strands 1032 (FIG. 2) to separate the strands 1032 as they travel through the system. The comb bottom mold lowering mechanism 20 is positioned between the tensioning structure length adjusting mechanism 6 and the tensioning structure cutting mechanism 8 and has an electric telescopic rod that is configured to lower and separate the comb bottom mold 14 from the bottom mold 13. The comb bottom mold 14 is separated from the bottom mold 13 before reaching the sheet fusing mechanisms 17, 18 to avoid interfering with (e.g., puncturing) the upper and lower sheets 101, 102 (FIG. 5).

Figure 6:
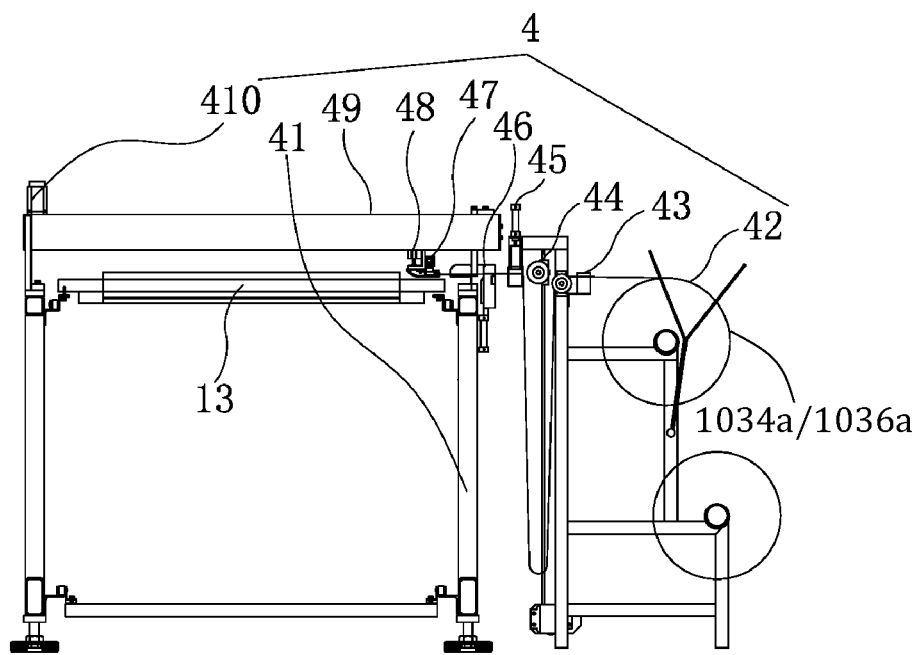
FIG. 6 is a side view of a lower strip mechanism of the first production system of FIG. 3.
Figure 7:
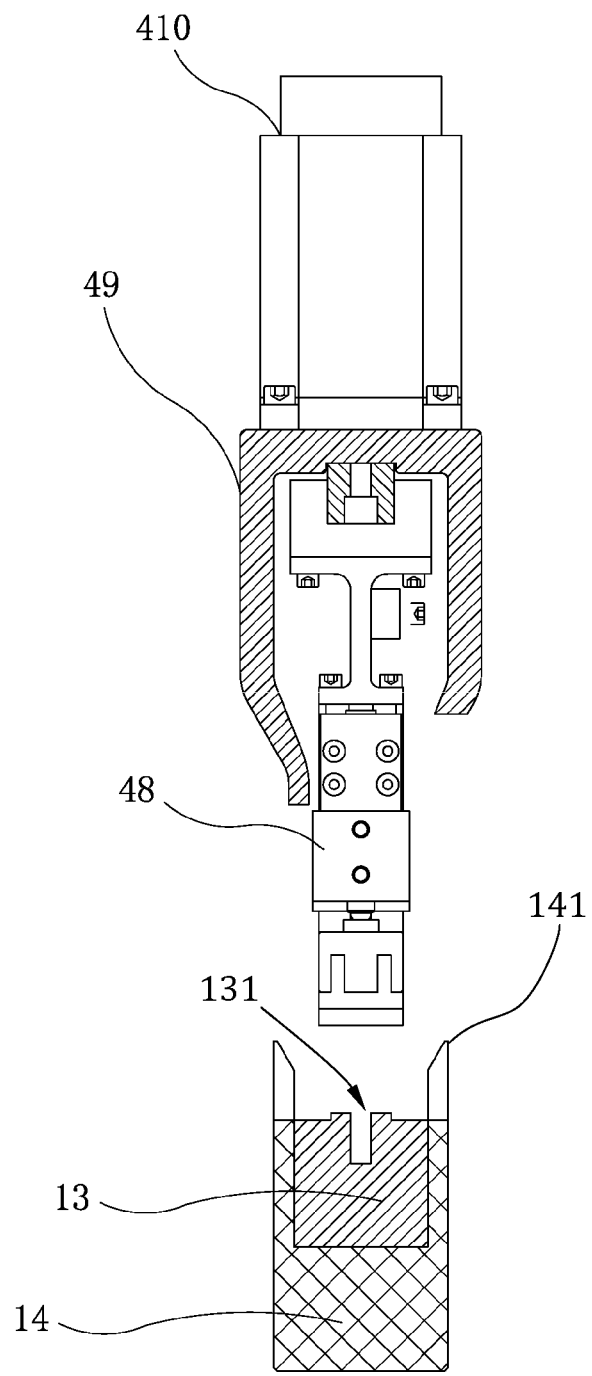
FIG. 7 is a cross-sectional view of the lower strip mechanism of FIG. 6.
Figure 8:
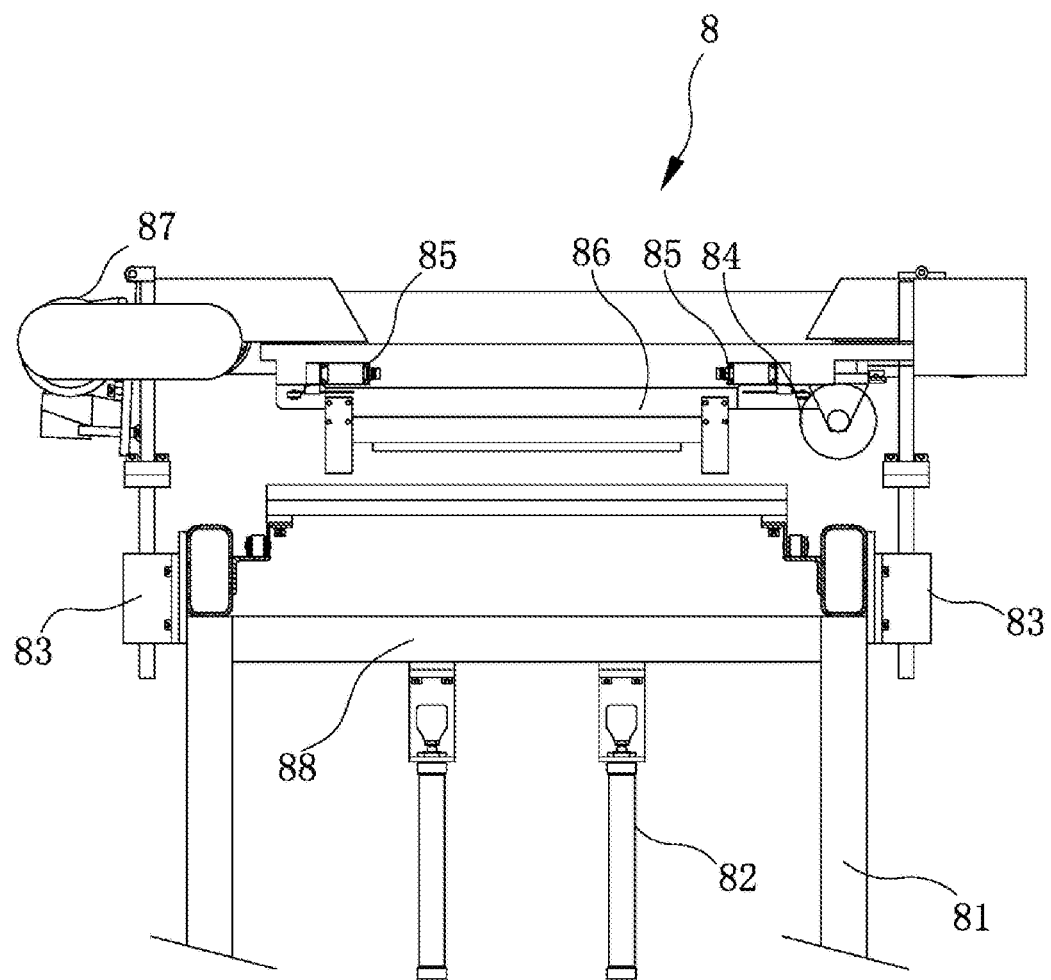
FIG. 8 is a side view of a tensioning structure cutting mechanism of the first production system of FIG. 3.
Figure 9:
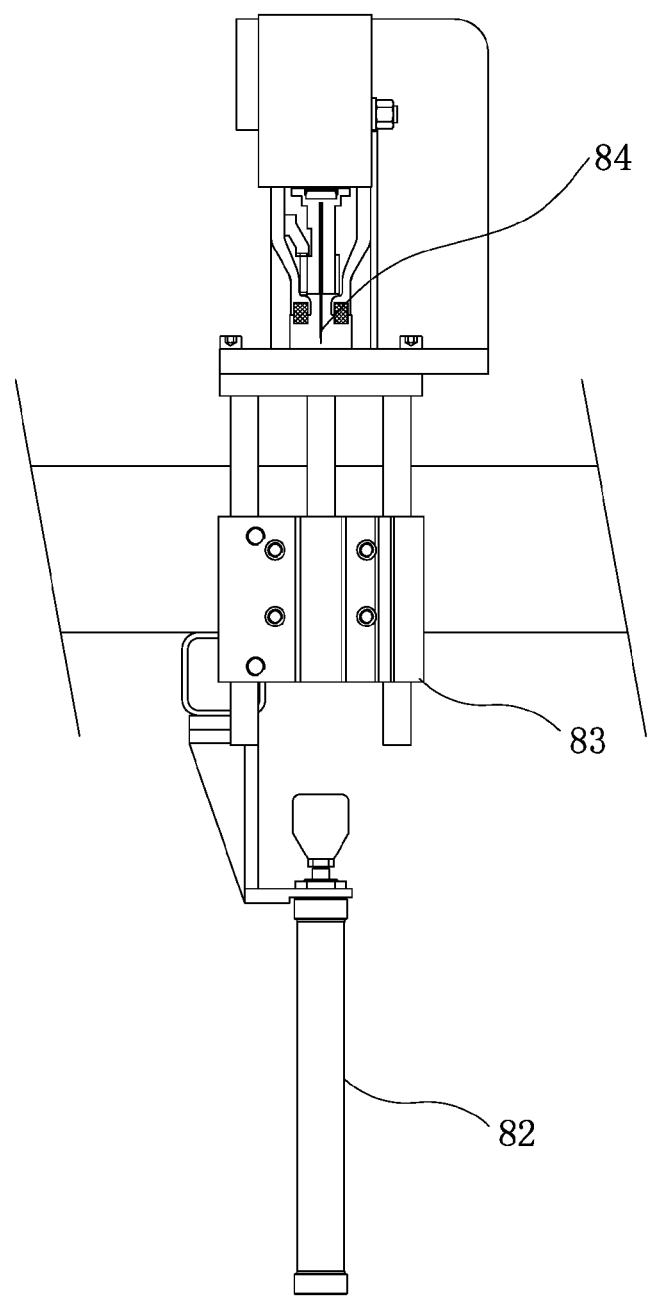
FIG. 9 is a front elevational view of the tensioning structure cutting mechanism of FIG. 8.

Referring next to FIGS. 6 and 7, the bottom strip mechanism 4 includes a strip mechanism frame 41, a bottom strip source (e.g., roller) 42, a material shortage detecting mechanism 43 (e.g., optical sensor), a material preparation roller 44, a strip pressing cylinder 45, a cutter mechanism 46, a clamp mechanism 47, a clamp raising cylinder 48, a strip mechanism cross beam 49, and a strip motor 410. The bottom strip source 42, the material shortage detecting mechanism 43, the material preparation roller 44, and the strip pressing cylinders 45 are all mounted on the right side of the strip mechanism frame 41 in FIG. 6 and are arranged in sequence according to the process. The strip mechanism cross beam 49 is bridged on the top of the support frame 161 of the bottom mold conveying mechanism 16 (FIG. 4). The upper, cylinder-end of the clamp raising cylinder 48 is slidably coupled to the strip mechanism cross beam 49, and the lower, rod-end of the clamp raising cylinder 48 is coupled to the clamp mechanism 47. The cutter mechanism 46 is mounted on the support frame 161 and located between the strip pressing cylinder 45 and the clamp mechanism 47. The strip motor 410 is mounted on the strip mechanism cross beam 49 and drives the clamp raising cylinder 48 to move back-and-forth along the strip mechanism cross beam 49 through a transmission mechanism (not shown).

The illustrative bottom strip mechanism 4 operates according to the following method.

In a first step (BS1), a desired length of the bottom weld strip material 1034a/1036a is unrolled from the bottom strip source 42. During this step BS1, the bottom weld strip material 1034a/1036a may be a single strip of material that is later cut. The strip pressing cylinder 45 presses and holds a forward end of the bottom weld strip material 1034a/1036a. Next, the material preparation roller 44 moves downward and presses the bottom weld strip material 1034a/1036a to unroll the desired length of the bottom weld strip material 1034a/1036a, from the bottom strip source 42. Then, the material preparation roller 44 and the strip pressing cylinder 45 move back upward and return to their starting positions.

In a second step (BS2), a forward portion of the bottom weld strip material 1034a/1036a is applied onto the bottom mold 13. The clamp mechanism 47 holds the forward end of the bottom weld strip material 1034a/1036a near the cutter mechanism 46. As the strip motor 410 operates, the clamp mechanism 47 moves leftward from the initial position of FIG. 6 to an intermediate position while pulling the forward portion of the bottom weld strip material 1034a/1036a across the bottom mold 13. The clamp mechanism 47 pauses at this intermediate position before reaching the strip motor 410.

In a third step (BS3), a rearward portion of the bottom weld strip material 1034a/1036a is cut and applied onto the bottom mold 13. The cutter mechanism 46 cuts a rearward end of the bottom weld strip material 1034a/1036a. As the strip motor 410 resumes operation, the clamp mechanism 47 continues moving leftward in FIG. 6 to a discharge position near the strip motor 410 with the cut, rearward portion of the bottom weld strip material 1034a/1036a pulled onto the bottom mold 13. Once the bottom weld strip material 1034a/1036a is in place across the bottom mold 13, the clamp mechanism 47 may release the bottom weld strip material 1034a/1036a and continue moving leftward in FIG. 6 a short distance to a release position, thereby separating the clamp mechanism 47 from the bottom weld strip material 1034a/1036a.

In a fourth step (BS4), the clamp raising cylinder 48 raises the clamp mechanism 47, and the strip motor 410 drives the clamp mechanism 47 back to the initial position of FIG. 6 to begin the next cycle. Step BS1 may be performed simultaneously with step BS4 such that the next bottom weld strip material 1034a/1036a is unrolled and ready to proceed to steps BS2 and BS3.

As noted above, the bottom strip mechanism 4 may be used alone or in combination with the top strip mechanism 10 (FIGS. 3 and 4). It is understood that the top strip mechanism 10, if used, may have the same structure and operation as that of the above-described bottom strip mechanism 4.

Figure 10:
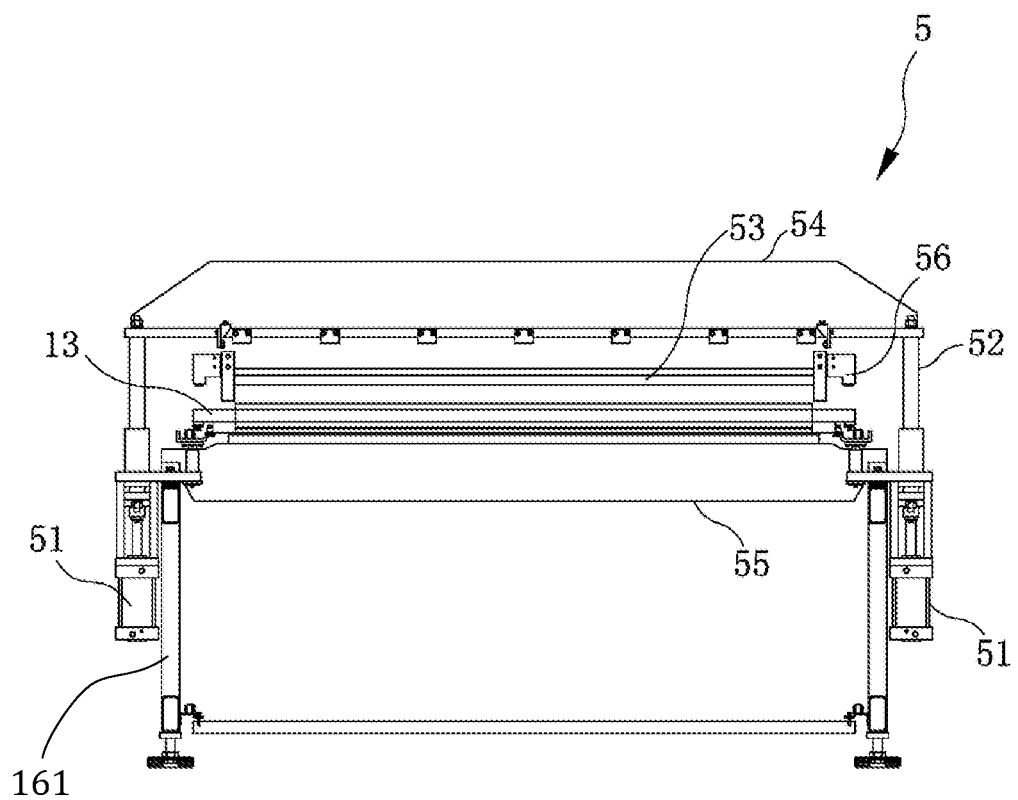
FIG. 10 is a side view of a tensioning structure fusing mechanism of the first production system of FIG. 3.
Figure 11:
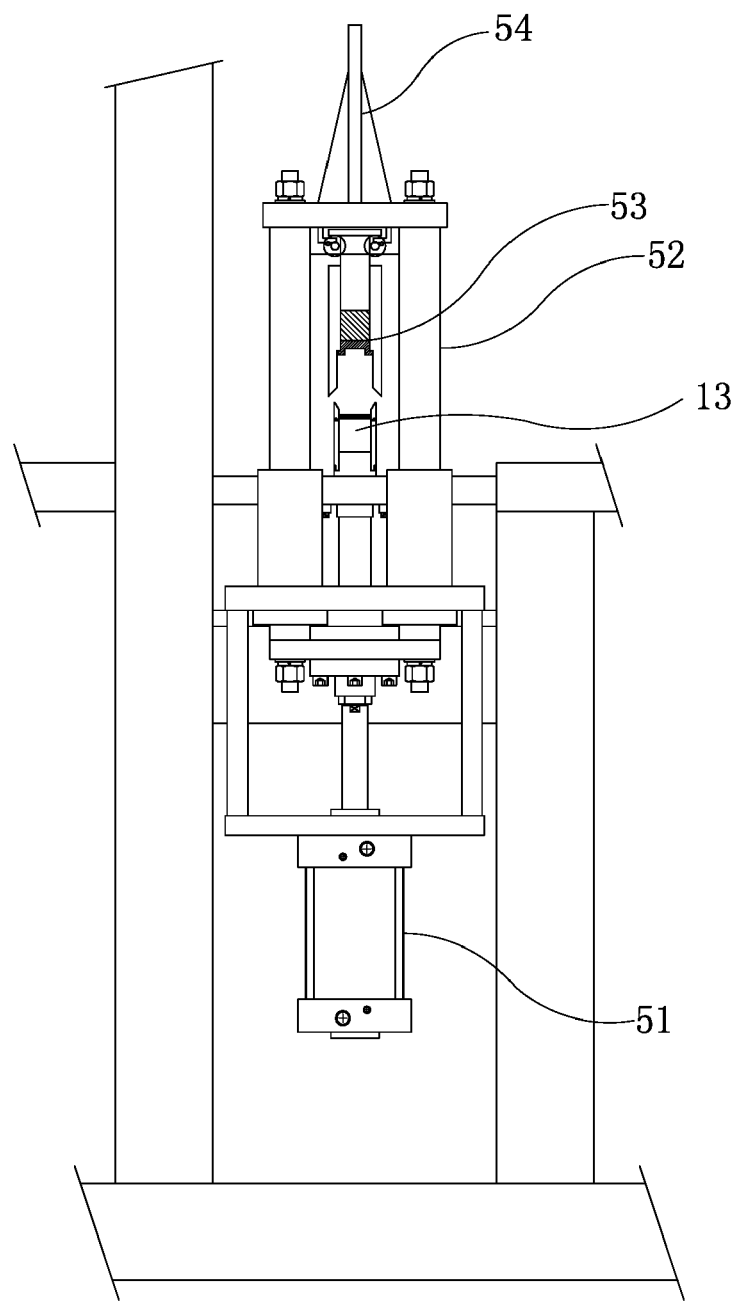
FIG. 11 is a front elevational view of the tensioning structure fusing mechanism of FIG. 10.

Referring next to FIGS. 10 and 11, the tensioning structure fusing mechanism 5 includes two downward-pressing cylinders 51, a guide rod 52, a heated upper mold 53, an upper flat plate 54, a lower flat plate 55, and a high-frequency generator 56. The cylinder-ends of the two downward-pressing cylinders 51 are respectively mounted on the two sides of the support frame 161 of the bottom mold conveying mechanism 16 (FIGS. 3 and 4), and the two ends of the upper flat plate 54 are respectively connected to the rod-ends of the two downward-pressing cylinders 51 through the guide rod 52. The upper mold 53 is fixed to the bottom of the upper flat plate 54, and the lower flat plate 55 is mounted on the support frame 161 directly below the upper mold 53. The upper mold 53 is powered by the high-frequency generator 56.

The illustrative tensioning structure fusing mechanism 5 operates according to the following method.

In a first step (FS1), the bottom mold 13 carries the bottom weld strip material 1034a/1036a from the bottom strip mechanism 4 and the top weld strip material 1034b/1036b from the top strip mechanism 10 (FIG. 5) to the tensioning structure fusing mechanism 5.

In a second step (FS2), the tensioning structure fusing mechanism 5 engages the tensioning structure 1031 (FIG. 5). The downward-pressing cylinders 51 at both sides are retracted, which moves the upper flat plate 54 downward along the guide rod 52. The upper mold 53 moves downward with the upper flat plate 54 and contacts the top weld strip material 1034b/1036b. The bottom mold 13 is supported by the lower flat plate 55.

In a third step (FS3), the tensioning structure fusing mechanism 5 is operated to weld the tensioning structure 1031 (FIG. 5). The high-frequency generator 56 is activated, and a high-frequency signal is input to the upper mold 53 for high-frequency welding against the bottom mold 13. The upper mold 53 welds the bottom weld strip material 1034a to the corresponding top weld strip material 1034b, thereby forming the upper weld strip pair 1034a/1034b, and the bottom weld strip material 1036a to the corresponding top weld strip material 1036b, thereby forming the lower weld strip pair 1036a/1036b, with the strands 1032 captured therebetween.

In a fourth step (FS4), the tensioning structure fusing mechanism 5 is reset for the next cycle. The downward-pressing cylinders 51 extend to lift the upper flat plate 54 and the upper mold 53. The bottom mold 13 then moves downstream, and the above steps FS1-FS4 repeat during the next cycle.

Referring back to FIGS. 8 and 9, the tensioning structure cutting mechanism 8 includes a cutting frame 81, a cutting upward-pressing cylinder 82, a cutting downward-pressing cylinder 83, a circular blade 84, a cutting limit switch 85, a cutting beam 86, a cutting motor 87, and an upward-pressing plate 88. The cutting frame 81 is mounted on the frame 12 (FIG. 3), and the cylinder-end of the cutting upward-pressing cylinder 82 is fixed on the cutting frame 81. The upward-pressing plate 88 is fixed to the rod-end of the cutting upward-pressing cylinder 82 and move vertically up and down to press against the bottom mold 13. The cylinder-end of the cutting downward-pressing cylinder 83 is fixed on the cutting frame 81, and the cutting beam 86 is fixed to the rod-end of the cutting downward-pressing cylinder 83 and can move vertically up and down. The cutting motor 87 is mounted on the cutting frame 81, and the cutting motor 87 drives the circular blade 84 to rotate and move along the cutting beam 86 through a transmission mechanism (not shown). Respective cutting limit switches 85 are attached to both ends of the cutting beam 86.

The illustrative tensioning structure cutting mechanism 8 operates according to the following method.

In a first step (CS1), the bottom mold 13 carries the weld strip pairs 1034a/1034b and 1036a/1036b of the tensioning structure 1031 from the tensioning structure fusing mechanism 5 (FIG. 5) to the tensioning structure cutting mechanism 8.

In a second step (CS2), the tensioning structure cutting mechanism 8 engages the tensioning structure 1031 (FIG. 5). The cutting upward-pressing cylinder 82 is extended to raise the upward-pressing plate 88 into supporting engagement with the bottom mold 13. The cutting downward-pressing cylinder 83 is retracted to lower the cutting beam 86 into engagement with the weld strip pairs 1034a/1034b and 1036a/1036b of the tensioning structure 1031.

In a third step (CS3), the tensioning structure cutting mechanism 8 cuts the adjacent tensioning structures 1031 (FIG. 5). The cutting motor 87 is activated, which drives the circular blade 84 to move along the cutting beam 86 until reaching the opposing limit switch 85, which stops the cutting motor 87. The circular blade 84 may travel through the slit 131 in the bottom mold 13 (FIG. 7) during this step CS3. The cutting direction of step CS3 may be perpendicular to direction of travel of the tensioning structures 1031 through the system and perpendicular to the direction of strands 1032. After step CS3, the leading weld strip pair 1034a/1034b on the bottom mold 13 are separated from the trailing weld strip pair 1036a'/1036b' on the same bottom mold 13 (FIG. 5).

In a fourth step (CS4), the tensioning structure cutting mechanism 8 is reset for the next cycle. The cutting downward-pressing cylinder 83 is extended to lift the cutting beam 86 away from the bottom mold 13. The cutting upward-pressing cylinder 82 is retracted to release the upward-pressing plate 88 from the bottom mold 13. The cutting motor 87 also returns the circular blade 84 to its starting position. The bottom mold 13 then moves downstream, and the above steps CS1-CS4 repeat during the next cycle.

Figure 12:
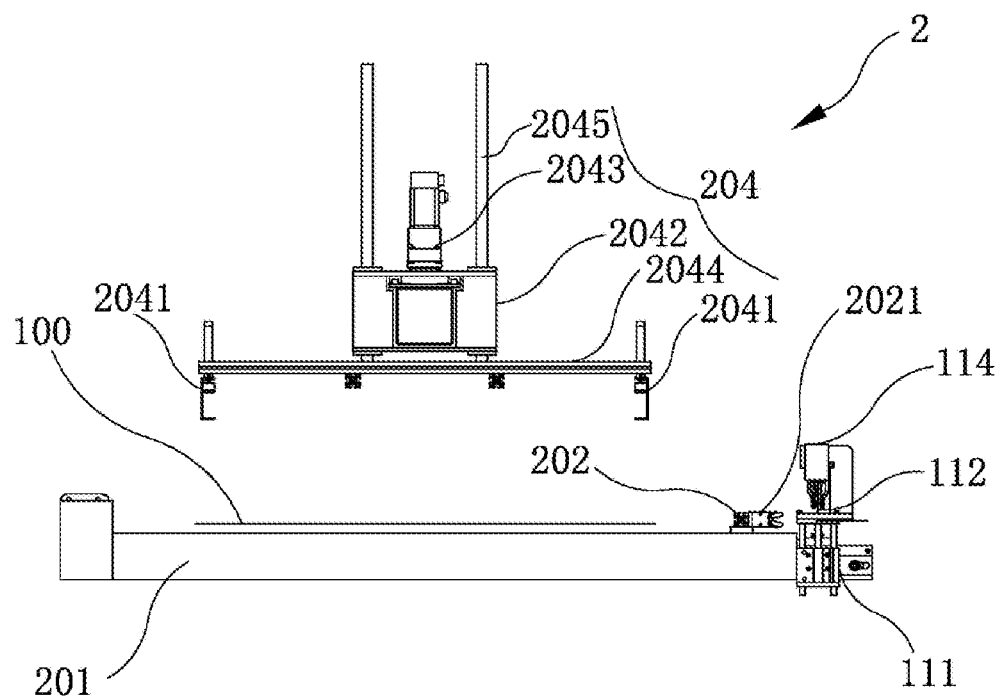
FIG. 12 is a front elevational view of a preassembly receiving mechanism and a preassembly cutting mechanism of the first production system of FIG. 3.
Figure 13:
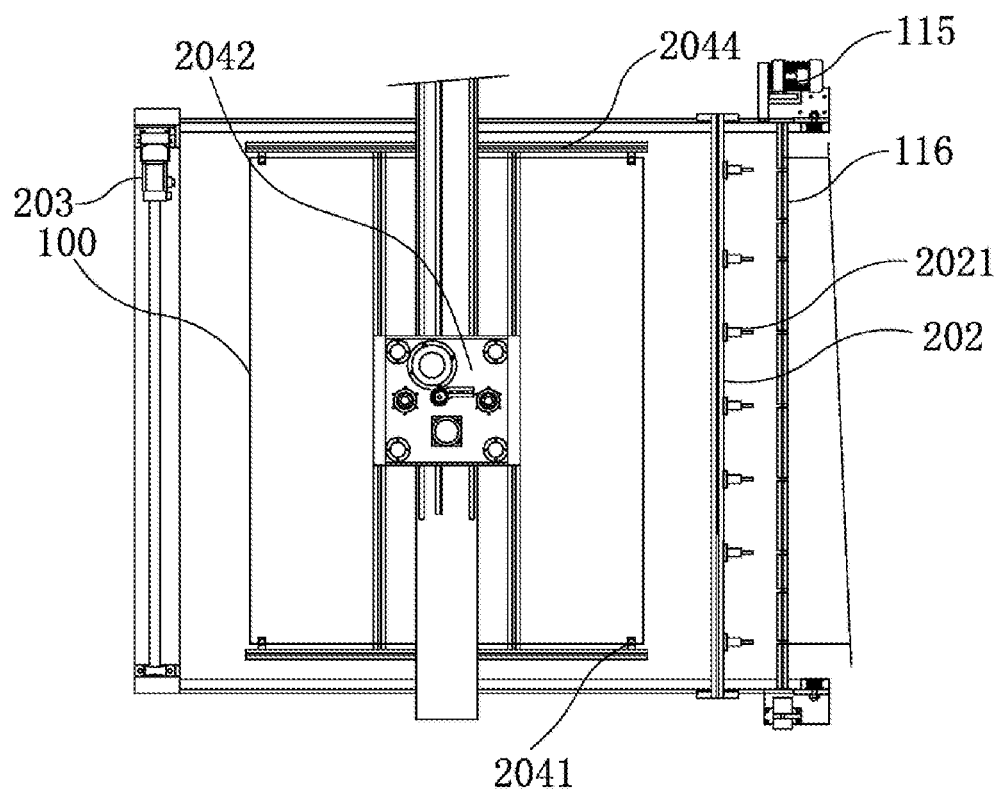
FIG. 13 is a top plan view showing the preassembly receiving mechanism and the preassembly cutting mechanism of FIG. 12.

Referring next to FIGS. 12-13, the preassembly receiving mechanism 2 includes a finished-product frame 201, a clamp set 202 having one or more clamps 2021, a platform motor 203, and a manipulator 204. The finished-product frame 201 is fixedly mounted on top of the frame 12 (FIG. 3). The manipulator 204 is fixedly mounted on the finished-product frame 201 and is located directly above the finished-product frame 201. The platform motor 203 is mounted on one side of the finished-product frame 201 and is operably coupled to the clamp set 202 through a transmission mechanism (not shown) to move the clamp set 202 side-to-side across the finished-product frame 201. The manipulator 204 may include a receiving clamp set 2041, a moving base 2042, a translation motor 2043, a moving frame 2044, and a lifting motor 2045. The moving base 2042 is mounted directly above the finished-product frame 201, and the moving frame 2044 is slidably coupled to the moving base 2042. The translation motor 2043 is mounted on the moving base 2042 and drives the moving frame 2044 to translate side-to-side relative to the moving base 2042. The lifting motor 2045 is mounted on the moving base 2042 and drives the moving frame 2044 to move up and down relative to the moving base 2042. The receiving clamp set 2041 is mounted on the moving frame 2044.

Figure 14:
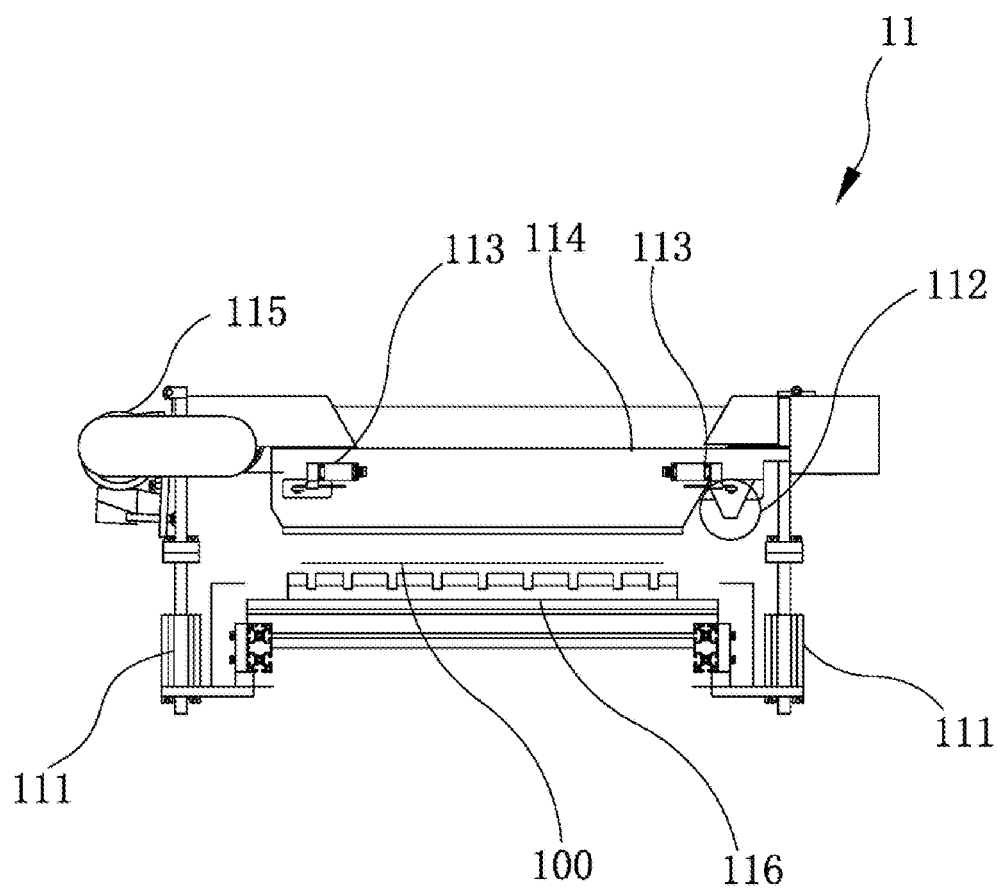
FIG. 14 is a side view of the preassembly cutting mechanism of FIG. 12.

Referring next to FIGS. 12-14, the preassembly cutting mechanism 11 includes two finished-product cylinders 111, a circular blade 112, limit switches 113, a finished-product cutter beam 114, a blade motor 115, and a cutting bottom beam 116. The cylinder-ends of the two finished-product cylinders 111 are respectively fixed on both sides of the finished-product frame 201. The upper, rod-ends of the two finished-product cylinders 111 are respectively connected to the two ends of the finished-product cutter beam 114 (FIG. 14), so that the finished-product cutter beam 114 is bridged on the inner side of the finished-product frame 201 (FIG. 13). The blade motor 115 is slidably coupled to the finished-product cutter beam 114 and is movable back and forth along the finished-product cutter beam 114. The blade 112 is fixedly mounted on the output shaft of the blade motor 115. Respective limit switches 113 are mounted on both ends of the finished-product cutter beam 114. The cutting bottom beam 116 is fixedly mounted on the finished-product frame 201 and directly below the finished-product cutter beam 114.

The illustrative preassembly receiving mechanism 2 and preassembly cutting mechanism 11 operate according to the following method.

In a first step (FP1), the clamp set 202 clamps a forward end of the finished sheet 100" (FIG. 5). The clamp set 202 is positioned near the cutting beam 116 as shown in FIGS. 12 and 13 with the clamps 2021 engaged to hold the forward end of the finished sheet 100".

In a second step (FP2), the clamp set 202 pulls a forward portion of the finished sheet 100" (FIG. 5) across the finished-product frame 201. As the platform motor 203 operates, the clamp set 202 moves leftward from the initial position of FIG. 12 to an intermediate position. The platform motor 203 stops when the finished sheet 100" reaches a desired length.

In a third step (FP3), the preassembly cutting mechanism 11 cuts the finished sheet 100" to the desired length, thereby forming the above-described preassembly 100'. The finished-product cylinder 111 is retracted, and the finished-product cutter beam 114 is lowered to press the finished sheet 100" against the cutting bottom beam 116. The blade motor 115 drives the blade 112 to move across and cut the finished sheet 100" until encountering the opposing limit switch 113, which stops the blade motor 115. The cutting direction of step FP3 may be perpendicular to direction of travel of the finished sheet 100" through the system and perpendicular to the direction of strands 1032.

In a fourth step (FP4), the preassembly cutting mechanism 11 is reset for the next cycle. The finished-product cylinder 111 is extended, and the finished-product cutter beam 114 is raised to the starting position to wait for the next finished sheet 100".

In a fifth step (FP5), the clamp set 202 continues to pull the cut, rearward end of the preassembly 100' onto the finished-product frame 201. Once the preassembly 100' is in place on the finished-product frame 201, the clamps 2021 of the clamp set 202 may release the preassembly 100' and continue moving leftward in FIG. 12 a short distance to a release position, thereby separating the clamp set 202 from the preassembly 100'. The platform motor 203 may then return the clamp set 202 to the initial position of step FP1 near the cutting bottom beam 116 to begin the next cycle.

In a sixth step (FP6), the manipulator 204 moves the preassembly 100' from the finished-product frame 201 to another location (e.g., a storage container, a pallet). The lifting motor 2045 operates to lower the moving base 2042 toward the preassembly 100'. Then, the receiving clamp set 2041 operates to clamp the preassembly 100'. Next, the lifting motor 2045 operates to raise the moving base 2042 and lift the preassembly 100'. Then, the translation motor 2043 operates to move the moving base 2042 horizontally to another location apart from the frame 12 (FIG. 3). Finally, the receiving clamp set 2041 is released to deposit the preassembly 100' at the other location. The manipulator 204 may then return to its initial position to await the next preassembly 100'.

3. Second Embodiment (FIGS. 15-17)

Figure 15:
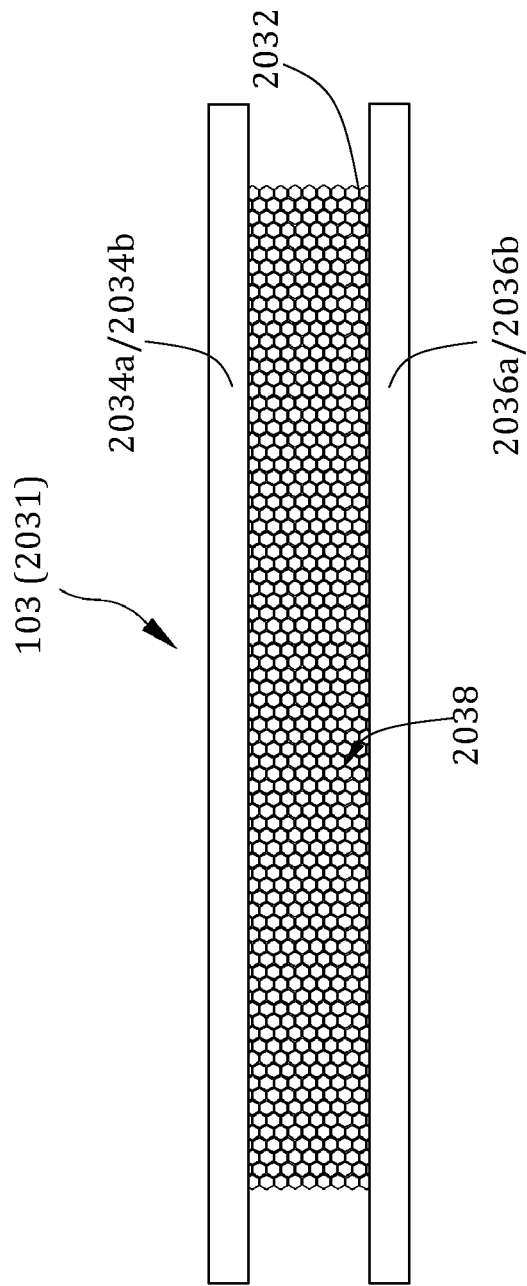
FIG. 15 is a schematic view of a second tensioning structure of the present disclosure.

FIG. 15 discloses a second exemplary tensioning structure 300, specifically tensioning structure 2031, for use in the inflatable product 100 of FIG. 1. The illustrative tensioning structure 2031 includes interwoven strands in the form of a mesh material 2032 with spaces or pores 2038 between adjacent strands. The mesh material 2032 is coupled to at least one upper weld strip 2034 and at least one lower weld strip 2036. According to an exemplary embodiment, the mesh material 2032 is sandwiched between a pair of upper weld strips 2034a/2034b and a pair of lower weld strips 2036a/2036b disposed on opposing sides of the mesh material 2032. However, it is also within the scope of the present disclosure to use a single upper weld strip 2034 and a single lower weld strip 2036, each disposed on only one side of the mesh material 2032. Additional information regarding tensioning structures having interwoven strands is disclosed in the above-incorporated International Publication Nos. WO 2013/130117 and WO 2015/010058.

Figure 16:
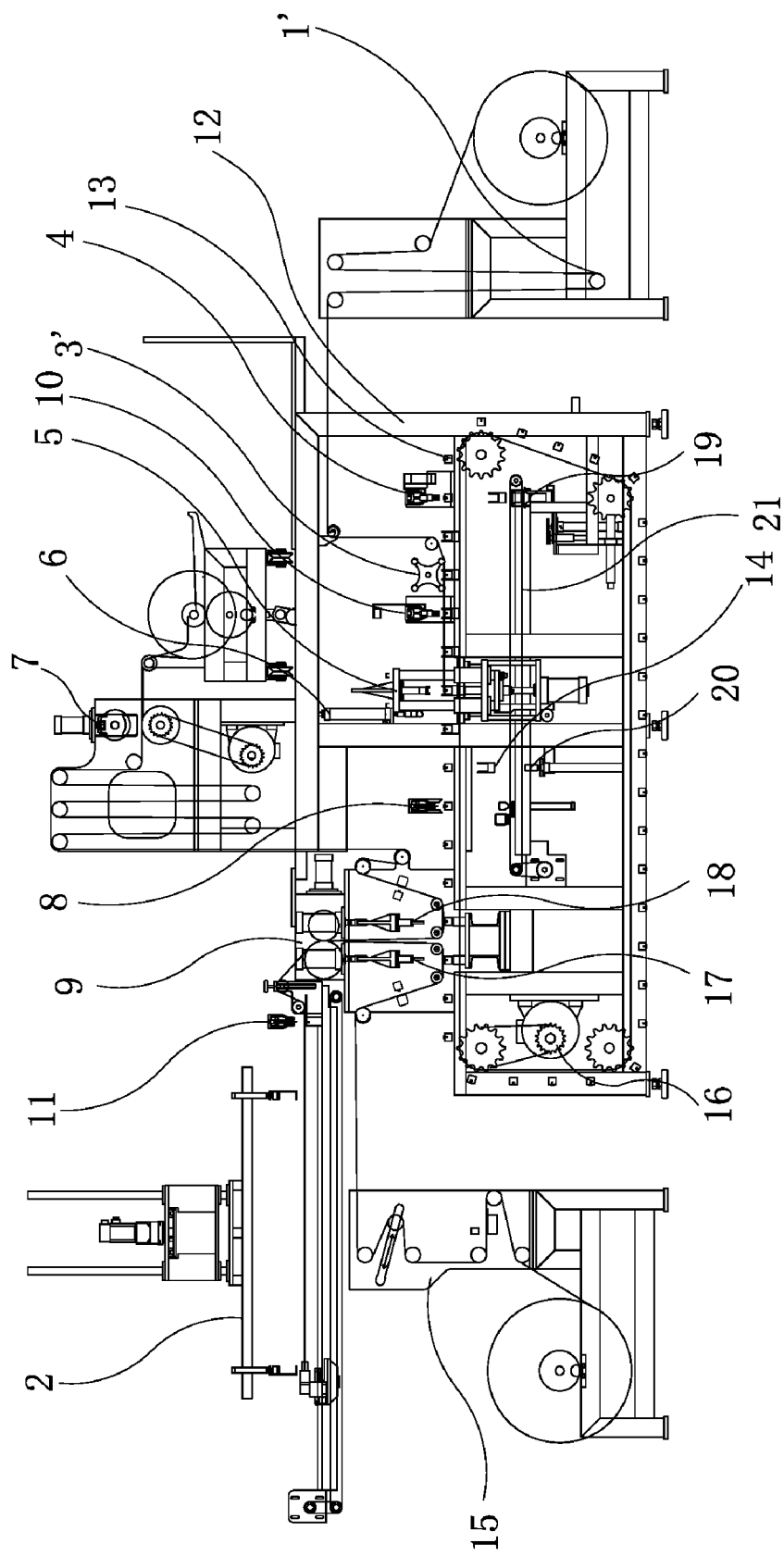
FIG. 16 is a schematic view of a second production system of the present disclosure.
Figure 17:
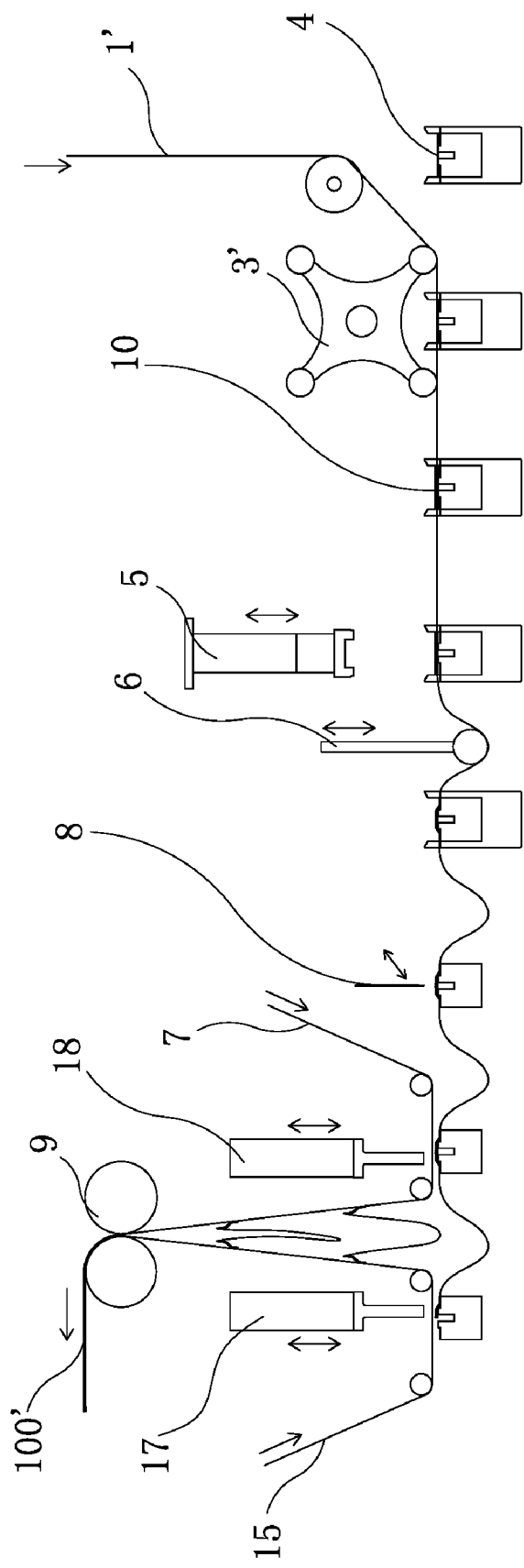
FIG. 17 is a schematic view of a second production method of the present disclosure.

Referring next to FIGS. 16 and 17, an automated system and method are provided to produce at least the preassembly 100' of the inflatable product 100 of FIG. 1, specifically the upper and lower sheets 101, 102, and the tensioning structures 2031 of the inflatable product 100. The system and method of FIGS. 16 and 17 are similar to the above-described system and method of FIGS. 3 and 5, except as described herein. Specifically, the mesh source 1' may replace the strand source 1 of FIGS. 3 and 5, and the mesh pressing mechanism 3' may replace the strand pressing mechanism 3 of FIGS. 3 and 5.

4. Third Embodiment (FIGS. 18-20)

Figure 18:
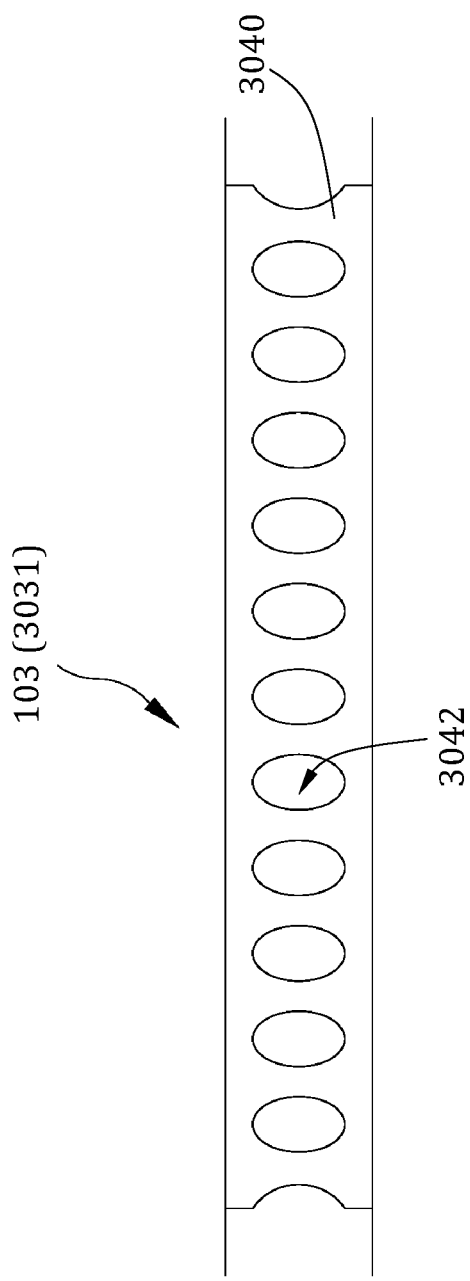
FIG. 18 is a schematic view of a third tensioning structure of the present disclosure.

FIG. 18 discloses a third exemplary tensioning structure 300, specifically tensioning structure 3031, for use in the inflatable product 100 of FIG. 1. The illustrative tensioning structure 3031 includes at least one weld sheet 3040. The tensioning structure 3031 may include additional layers (not shown), such as a second weld sheet with parallel or woven strands positioned therebetween. The weld sheet 3040 may define a plurality of apertures 3042.

The tensioning structure 3031 of FIG. 18 may be incorporated into the inflatable product 100 of FIG. 1 by welding an upper end of the weld sheet 3040 to the upper sheet 101 and a lower end of the weld sheet 3040 to the lower sheet 102. The upper and lower sheets 101, 102 and the weld sheet 3040 are constructed partially or entirely of weldable plastic (e.g., PVC) to facilitate a strong, long-lasting weld therebetween. Additional information regarding tensioning structure 3031 is disclosed in the above-incorporated International Publication No. WO 2013/130117.

Figure 19:
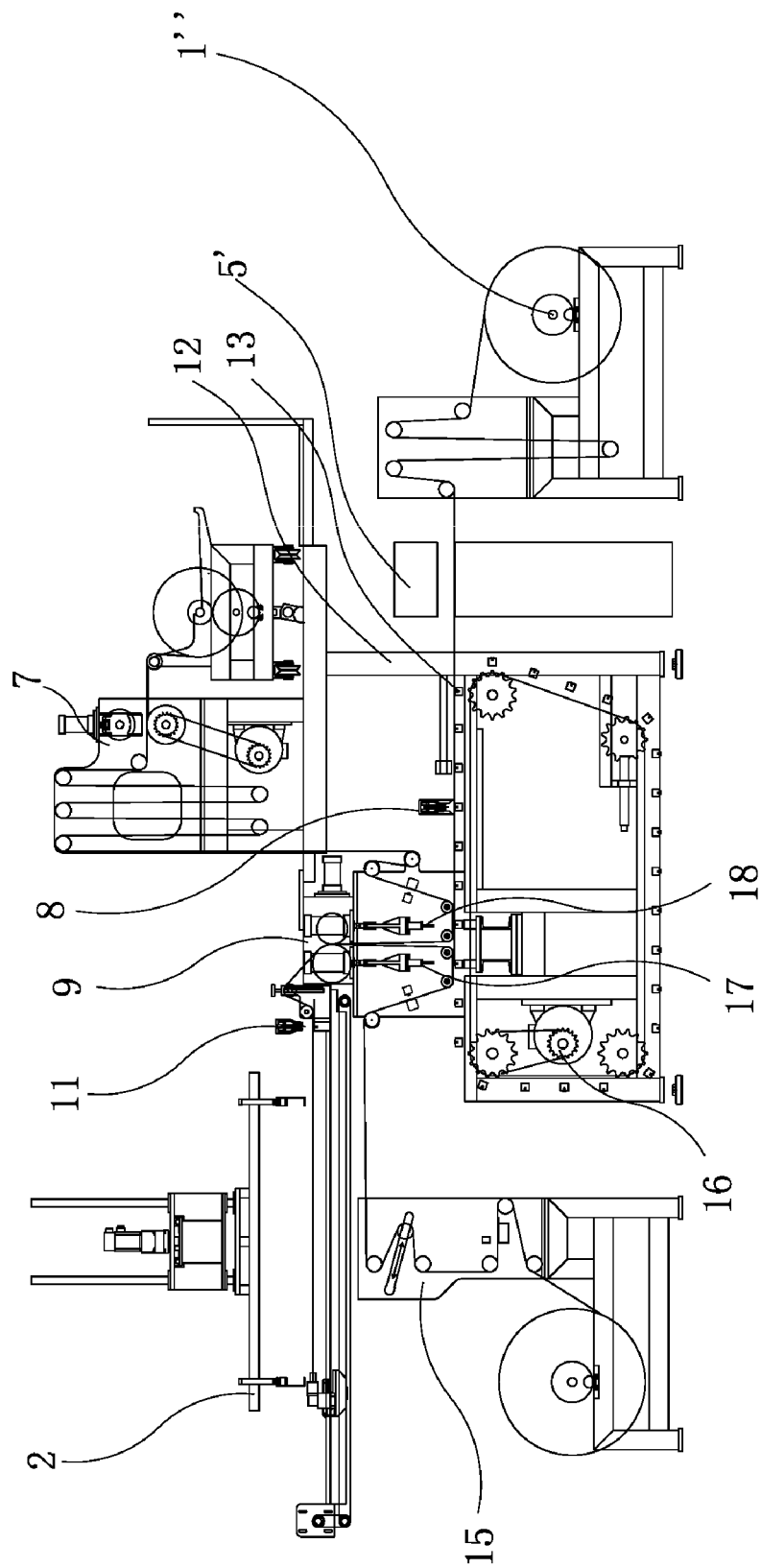
FIG. 19 is a schematic view of a third production system of the present disclosure.
Figure 20:
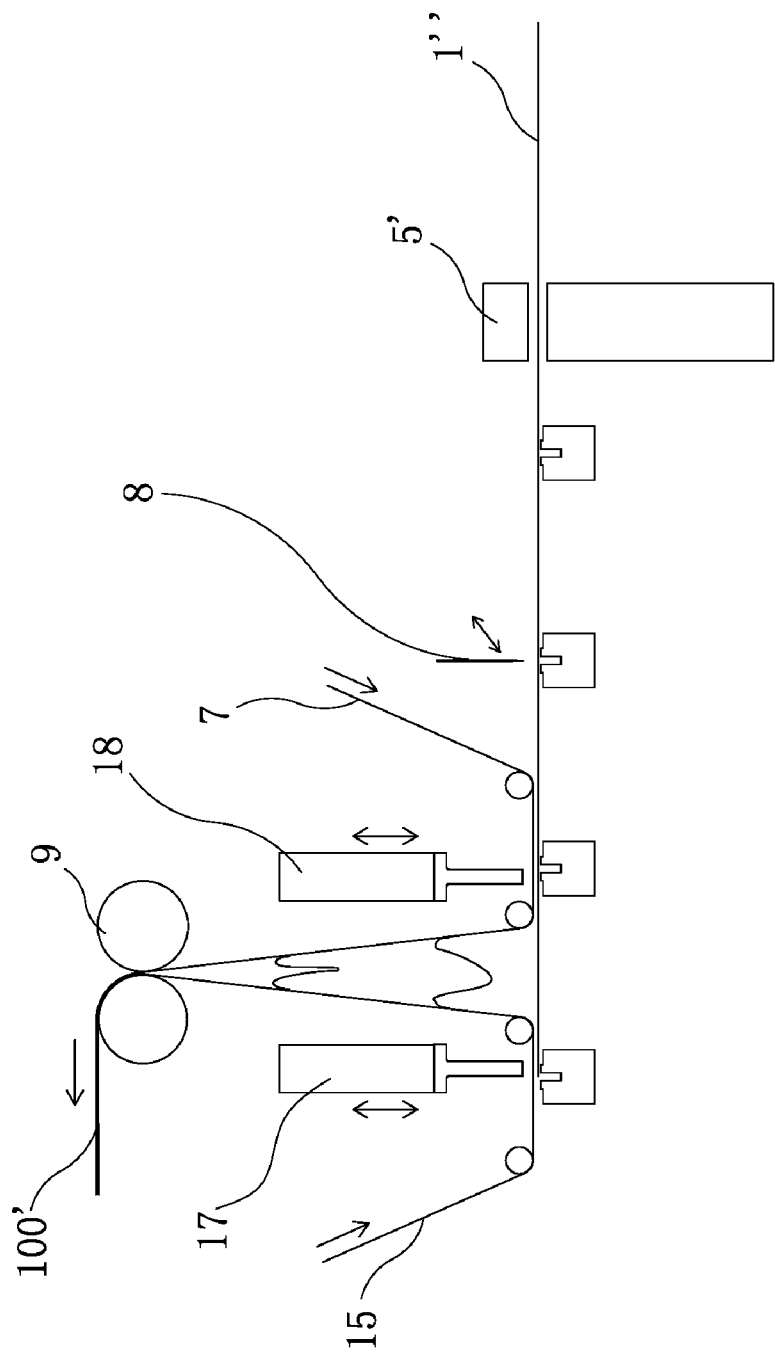
FIG. 20 is a schematic view of a third production method of the present disclosure.

Referring next to FIGS. 19 and 20, an automated system and method are provided to produce at least the preassembly 100' of the inflatable product 100 of FIG. 1, specifically the upper and lower sheets 101, 102, and the tensioning structures 3031 of the inflatable product 100. The system and method of FIGS. 19 and 20 are similar to the above-described system and method of FIGS. 3 and 5, except as described herein. Specifically, a sheet source 1" may replace the strand source 1, the bottom strip mechanism 4, the strand pressing mechanism 3, and the top strip mechanism 10 of FIGS. 3 and 5. A punching mechanism 5' may replace the tensioning structure fusing mechanism 5 and the tensioning structure length adjusting mechanism 6. The punching mechanism 5' may have a plurality of dies (not shown) configured to form the apertures 3042 in the weld sheet 3040. In this embodiment, the comb bottom molds 14, the comb bottom mold raising mechanism 19, the comb bottom mold lowering mechanism 20, and the comb bottom mold conveying mechanism 21 may be eliminated.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for producing an inflatable product including a first sheet and a second sheet, the method comprising:
aligning a leading end of a first tensioning structure with a first welder and the first sheet, the first welder movable in a first plane;
aligning a trailing end of the first tensioning structure with a second welder and the second sheet, the second welder movable in a second plane spaced apart from the first plane; and
simultaneously welding the leading end of the first tensioning structure to the first sheet and the trailing end of the first tensioning structure to the second sheet by simultaneously operating the first and second welders.

2. The method of claim 1, further comprising:
conveying the first sheet to the first welder in a first direction; and
conveying the second sheet to the second welder in a second direction opposite the first direction.

3. The method of claim 2, further comprising conveying the first and second sheets and the first tensioning structure between the first and second welders in a third direction perpendicular to the first and second directions.

4. The method of claim 1, further comprising:
producing a second tensioning structure; and
cutting the first and second tensioning structures to separate the trailing end of the first tensioning structure from a leading end of the second tensioning structure;
wherein the trailing end of the first tensioning structure is positioned adjacent to the leading end of the second tensioning structure during the welding step.

5. The method of claim 1, further comprising cutting the first and second sheets after the welding step.

6. The method of claim 1, further comprising:
producing a second tensioning structure in series with the first tensioning structure;
welding the second tensioning structure to the first and second sheets;
producing a third tensioning structure in series with the second tensioning structure;
welding the third tensioning structure to the first and second sheets; and
cutting the first and second sheets between the second and third tensioning structures.

7. The method of claim 1, wherein:
the first welder is arranged vertically;
the second welder is arranged vertically; and
the first tensioning structure is arranged generally horizontally between the first and second welders during the welding step.

8. The method of claim 1, wherein the first tensioning structure moves horizontally before the welding step and moves vertically after the welding step.

9. The method of claim 1, further comprising:
welding a first pair of weld strips together at the leading end of the first tensioning structure with a plurality of strands captured therebetween; and
welding a second pair of weld strips together at the trailing end of the first tensioning structure with the plurality of strands captured therebetween.

10. The method of claim 9, further comprising adjusting a length of the plurality of strands between the first and second pairs of weld strips after welding the first pair of weld strips and before welding the second pair of weld strips.

11. A method for producing an inflatable product including a first sheet and a second sheet, the method comprising:
aligning a leading end of a first tensioning structure with a first welder and the first sheet;
aligning a trailing end of the first tensioning structure with a second welder and the second sheet;
simultaneously welding the leading end of the first tensioning structure to the first sheet and the trailing end of the first tensioning structure to the second sheet by simultaneously operating the first and second welders;
conveying the first sheet to the first welder in a first direction;
conveying the second sheet to the second welder in a second direction opposite the first direction; and
conveying the first and second sheets and the first tensioning structure between the first and second welders in a third direction perpendicular to the first and second directions.

* * * * *